(12) United States Patent
Carson et al.

(10) Patent No.: US 8,886,588 B2
(45) Date of Patent: Nov. 11, 2014

(54) STRUCTURED REQUIREMENT GENERATION AND ASSESSMENT

(71) Applicant: The Boeing Company, Chicago, IL (US)

(72) Inventors: Richard Steven Carson, Renton, WA (US); James Warren Foust, Buena Park, CA (US); Michele Gay Michalski, St. Louis, MO (US); Sook Kenna Kim, Newport Coast, CA (US); David G. Bond, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/020,544

(22) Filed: Sep. 6, 2013

(65) Prior Publication Data

US 2014/0149334 A1  May 29, 2014

Related U.S. Application Data

(63) Continuation-in-part of application No. 13/194,005, filed on Jul. 29, 2011, now Pat. No. 8,732,109.

(51) Int. Cl.
| | | |
|---|---|---|
| *G06F 17/00* | (2006.01) | |
| *G06N 5/02* | (2006.01) | |
| *G06Q 10/06* | (2012.01) | |
| *G06F 11/00* | (2006.01) | |

(52) U.S. Cl.
CPC .......... *G06N 5/02* (2013.01); *G06Q 10/06* (2013.01); *G06F 11/008* (2013.01)
USPC .......................................... 706/47

(58) Field of Classification Search
None
See application file for complete search history.

(56) References Cited

U.S. PATENT DOCUMENTS

| | | | |
|---|---|---|---|
| 5,963,938 A | 10/1999 | Wilson et al. | |
| 8,136,143 B2 | 3/2012 | Hannel et al. | |
| 8,339,946 B2 | 12/2012 | Barbaresi et al. | |
| 8,448,170 B2 | 5/2013 | Wipfel et al. | |
| 8,494,928 B2 | 7/2013 | Ebling et al. | |
| 2008/0228609 A1 | 9/2008 | Ebling et al. | |
| 2009/0303940 A1 | 12/2009 | Barbaresi et al. | |
| 2010/0280864 A1* | 11/2010 | Nakano et al. .................... | 705/7 |
| 2011/0072135 A1* | 3/2011 | Hannel et al. ................. | 709/225 |
| 2011/0126207 A1 | 5/2011 | Wipfel et al. | |

OTHER PUBLICATIONS

Carson et al., "Structured Requirement Generation and Assessment," U.S. Appl. No. 13/194,005, filed Jul. 29, 2011, 56 pages.
"About Requirements Assistant," pp. 1, Sunny Hills Consultancy BV, Requirements Analysis Department, Apeldoorn, The Netherlands. Retrieved on Jun. 21, 2011.http://www.requirementassistant.nl.
Halligan, "Requirements Quality Metrics: The Basis of Informed Requirements Engineering Management", pp. 1-19, Project Performance (Australia) Pty Ltd, Australia. Retrieved on Jun. 21, 2011. http://www.ppi-int.com/newsletter/SyEN-013.php#article.

(Continued)

*Primary Examiner* — Li-Wu Chang
(74) *Attorney, Agent, or Firm* — Yee & Associates, P.C.

(57) ABSTRACT

A method and apparatus for establishing a requirement. A requirement generator is configured to establish a structure for the requirement and establish elements for the requirement. A quality assessor is configured to establish a quality level for the requirement.

19 Claims, 11 Drawing Sheets

(56) References Cited

OTHER PUBLICATIONS

Non-final office action dated Jul. 5, 2013 regarding U.S. Appl. No. 13/194,005, 19 pages.

"Teamcenter for Systems Engineering: White Paper—A holistic approach to understanding complex products and reducing business and engineering risk," Siemens Product Lifecycle Management Software Inc., copyright 2011, 17 pages, accessed Sep. 6, 2013 http://m.plm.automation.siemens.com/en_us/Images/Siemens-PLM-Teamcenter-Systems-Engineering-wp_tcm1224-5906.pdf.

Nielsen, "Documents as geometric objects: how to rank documents for full-text search," dated Jul. 7, 2011, 9 pages. Accessed Jan. 29, 2014, from http://www.michaelnielsen.org/ddi/documents-as-geometric-objects-how-to-rank-documents-for-full-text-search/.

Final Office Action dated Dec. 3, 2013 regarding U.S. Appl. No. 13/194,005, 23 pages.

Notice of Allowance dated Feb. 5, 2014 regarding U.S. Appl. No. 13/194,005, 11 pages.

* cited by examiner

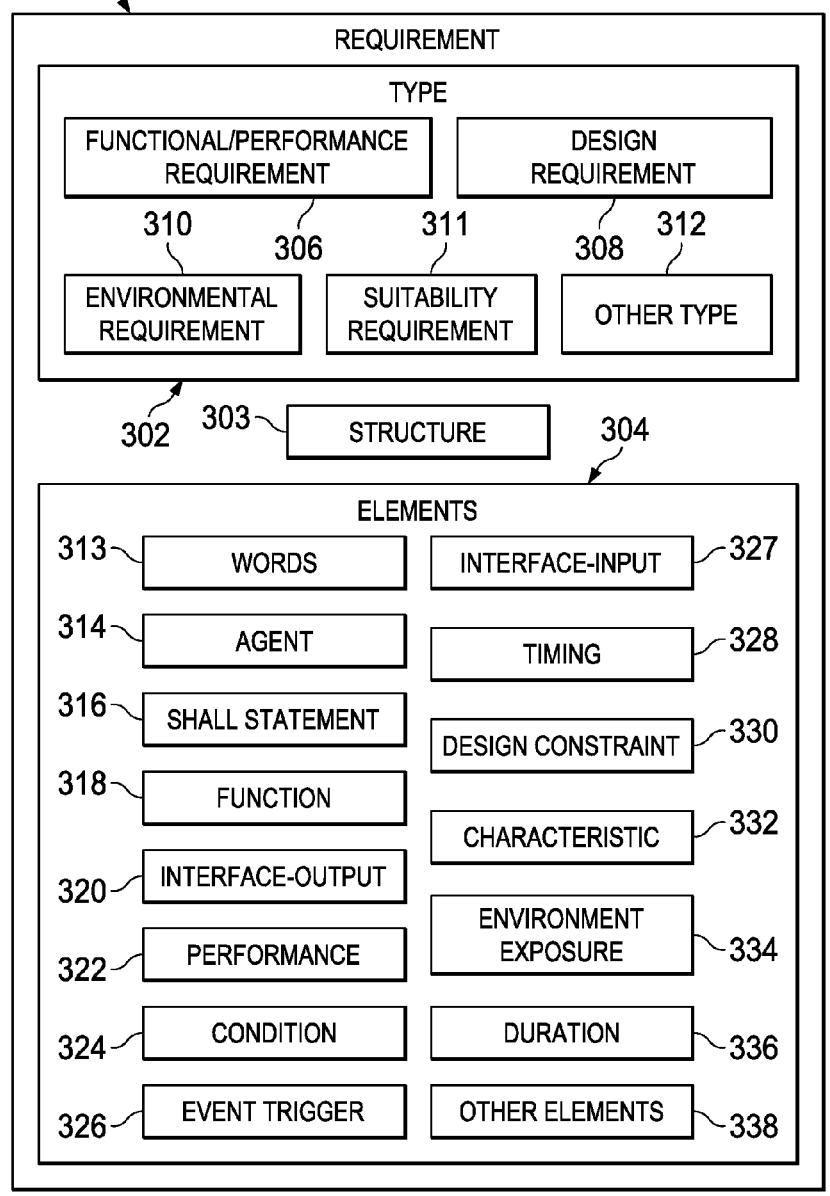
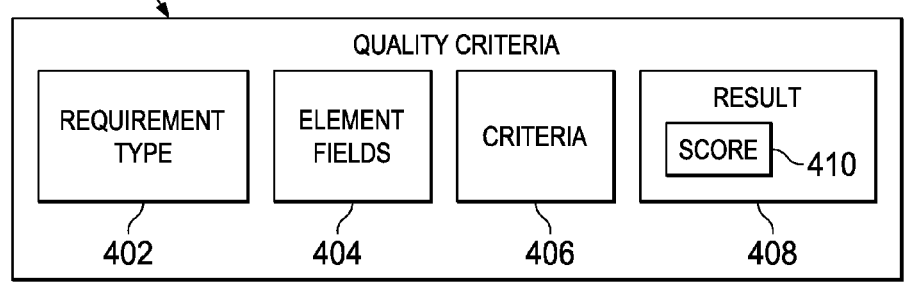

STRUCTURED REQUIREMENT GENERATION AND ASSESSMENT

CONTINUATION-IN-PART

This application is a continuation-in-part of U.S. patent application Ser. No. 13/194,005, filed Jul. 29, 2011, entitled "Structured Requirement Generation and Assessment," which is incorporated herein by reference.

BACKGROUND INFORMATION

1. Field

The present disclosure relates generally to requirements for products and services and, in particular, to tools for establishing requirements. Still more particularly, the present disclosure relates to a method and apparatus for establishing a structure for a requirement and for establishing the quality of the requirement as the requirement is being written.

2. Background

Written requirements may be used to establish and communicate various characteristics of items. These items may be products, services, or both. For example, an acquirer of items may establish requirements to communicate the characteristics of items to be acquired to a supplier. The requirements may become part of a contract or other agreement between the acquirer and the supplier concerning the items.

The supplier may use the requirements to develop the items. For example, the supplier may use the requirements to design the items, to manufacture the items, or otherwise to provide the items to the acquirer. The supplier may employ a requirements management tool to ensure that the items are developed in a manner that satisfies the requirements. Items delivered to the acquirer by the supplier may be checked against the requirements to determine whether or not the items satisfy the requirements.

Establishing requirements for items may present a number of technical problems such that establishing requirements for items may not be performed in an effective and efficient manner by human developers alone. In the past, establishing well drafted requirements at the beginning of product development may have been less of an issue. Many skilled systems and multi-disciplined engineers may have been employed to review and revise requirements as a product was designed and eventually built. Currently, the requirement for such high levels of human effort and skill may make the development of some new products technically and economically unfeasible. This may be particularly true for more complex products, such as aerospace vehicles.

For less complex products, such as consumer products and automobiles, requirements need only define the performance or other characteristics of a relatively small number of component parts of the product. For example, requirements for a consumer product may define dozens to a few hundred component parts. Requirements for an automobile may define a few thousand component parts. Poorly drafted requirements for such relatively less complex products may not carry cost, performance, and schedule risks that cannot be mitigated before or during manufacturing of the product. A quality review of the requirements for a product may be performed relatively easily for a product with relatively few components. Furthermore, for less complex products, it may not be a great challenge to correct design and requirement errors or omissions, even late in the design and production cycles. The development of an integrated product architecture defining the requirements and the functional, logical, and physical architecture of a relatively less complex product may be manageable by human developers. For example, product life cycle information and product data management for relatively less complex products may be developed and performed manually by design, systems, and quality engineers over a relatively short period of months or one or two years.

More complex products, such as aerospace vehicles, may comprise millions of parts and components. The drafting of high quality requirements for such complex products may be far more complicated. The level of skill and the amount of effort required to design such a complex product and to develop requirements and an integrated product architecture for such a product may take millions of man-hours spanning a decade or more. The product definition defined by the requirements for such a complex product, and the integrated product architecture thereof, may be so complicated that it is impossible as a practical matter to employ a workforce of sufficient size and skill to enable the review of the tens of thousands of data items defining the requirements for such a product. Such data items may include a myriad of complicated requirements that establish the functional, physical, and logical elements of the integrated product architecture.

The cost, schedule, and performance risks for poorly drafted requirements may be much higher for more complex products. Errors or omissions in the design and requirements definitions for a complex product may result in termination of the effort to develop the product. This is evidenced by the cancellation over the last decade of many programs for the development of commercial and military air and space vehicles.

Establishing requirements for relatively complex products, such as aerospace vehicles and other items, may not be performed in any practical manner by human developers alone. At the same time, the costs and risks associated with poorly drafted requirements may be higher for such complex items. Therefore, establishing requirements for relatively complex items and other items may present a number of technical problems.

The designing, manufacturing, and testing of items to satisfy requirements present various technical problems. For example, requirements for an item may define various technical characteristics of the item that must be included in the design for the item or satisfied by the design for the item. Requirements for the item may define or affect how the item is manufactured. Requirements for the item also may define or affect how the item is tested to determine whether the item satisfies the requirements.

Establishing accurate and unambiguous requirements for items presents another technical problem. Requirements that include errors or omissions, or that are ambiguous, may affect the design, manufacturing, and testing of items in undesired ways. For example, such requirements may result in items that do not satisfy desires or expectations. Such items may need to be redesigned and remanufactured at considerable expense.

Establishing requirements for items in an efficient manner presents another technical problem. For example, requirements for an item may need to be established before design, manufacturing, and testing of the item may begin or be completed. Therefore, delays in establishing requirements for items may result in undesired delays and costs in producing items. Furthermore, costs associated with establishing requirements for items may affect the total cost of the items in undesired ways. For example, higher levels of effort or skill that may be used to establish requirements for items may increase the costs of the requirements and of the resulting items.

Current systems and methods for establishing requirements may be less effective than desired for consistently generating accurate and unambiguous requirements in an efficient manner. Illustrative embodiments provide a technical solution to the problems of designing, manufacturing, and testing of items to satisfy requirements by providing a method and an apparatus for establishing accurate and unambiguous requirements for items in an efficient manner. Illustrative embodiments provide a technical solution to the problem of establishing accurate and unambiguous requirements for items by providing a system and a method for establishing the quality of requirements as the requirements are being established. Illustrative embodiments provide a technical solution to the problem of establishing requirements for items in an efficient manner by providing a system and a method for establishing desired structures for requirements.

Accordingly, it would be desirable to have a method and apparatus that takes into account one or more of the issues discussed above, as well as possibly other issues.

SUMMARY

Illustrative embodiments of the present disclosure provide an apparatus comprising a requirement generator and a quality assessor. The requirement generator is configured to establish a structure for a requirement and establish elements for the requirement. The quality assessor is configured to establish a quality level for the requirement.

Illustrative embodiments of the present disclosure also provide an apparatus comprising a requirement generator, a quality assessor, and a user interface. The requirement generator is configured to establish a structure for a requirement, establish automatically elements for the requirement using engineering data related to the elements in a requirements management tool, and identify a change in the engineering data related to the elements in the requirements management tool. The quality assessor is configured to establish a quality level for the requirement. The user interface is configured to display the structure for the requirement, receive the elements for the requirement, display a representation of the quality level for the requirement, and display an alert in response to an identification of the change in the engineering data related to the elements in the requirements management tool.

Illustrative embodiments of the present disclosure also provide a method for establishing a requirement. A type of the requirement is identified. A structure for the requirement is established by a processor unit based on the type of the requirement. Elements for the requirement are established by the processor unit. A quality level for the requirement is established by the processor unit. The structure for the requirement, the elements for the requirement, and an indication of the quality level for the requirement are displayed simultaneously.

Features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of an illustrative embodiment of the present disclosure when read in conjunction with the accompanying drawings, wherein:

FIG. 3 is an illustration of a block diagram of a requirement in accordance with an illustrative embodiment;

FIG. 4 is an illustration of a block diagram of quality criteria in accordance with an illustrative embodiment;

DETAILED DESCRIPTION

Figure 1:
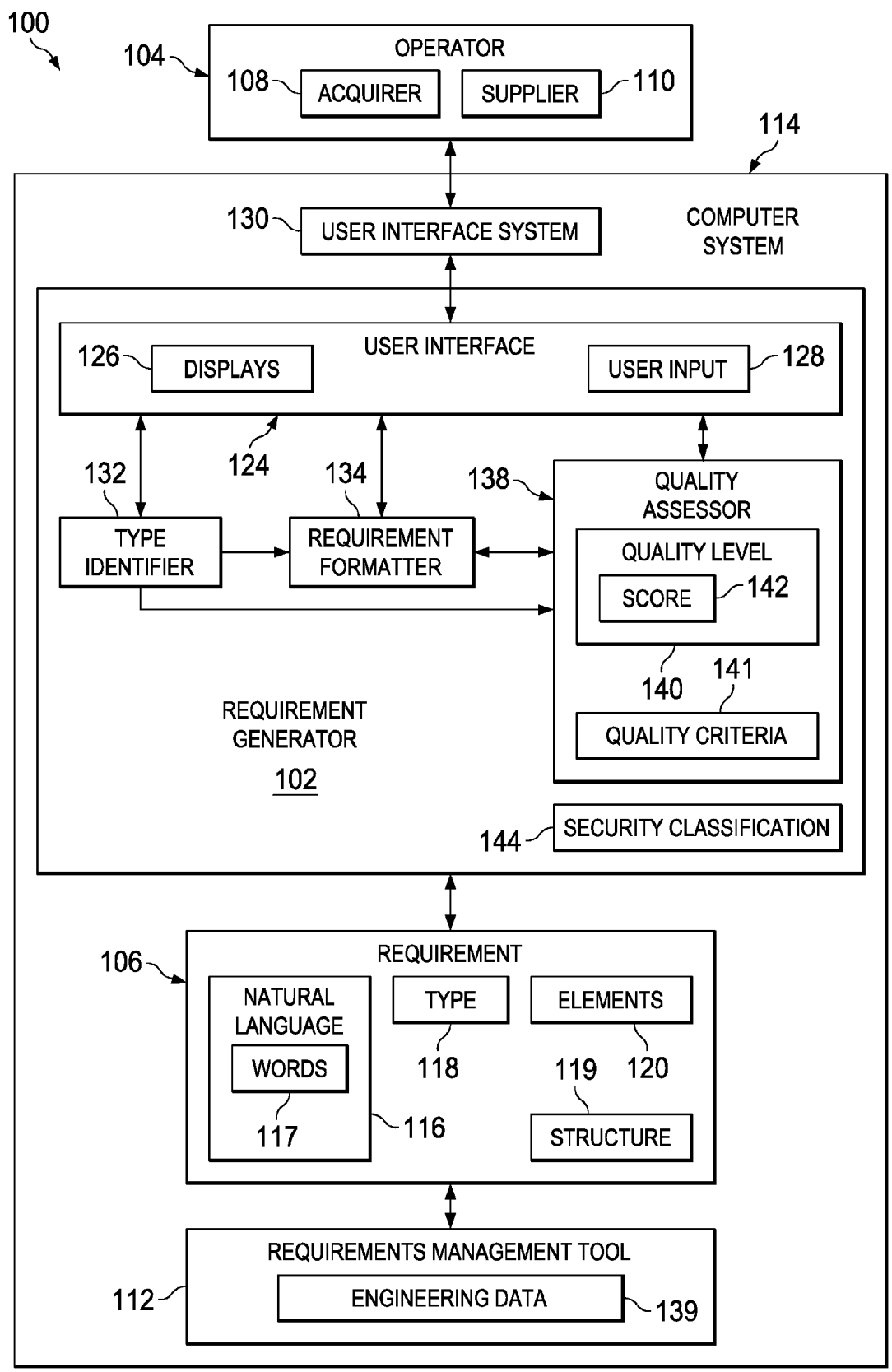
FIG. 1 is an illustration of a block diagram of a requirement generation environment in accordance with an illustrative embodiment.

The different illustrative embodiments recognize and take into account a number of different considerations. "A number," as used herein with reference to items, means one or more items. For example, "a number of different considerations" are one or more different considerations.

The different illustrative embodiments recognize and take into account that the development of items to satisfy requirements presents various technical problems. For example, the different illustrative embodiments recognize and take into account that, in industry, poor-quality requirements may lead to schedule delays and increased costs during the development of various items. Accurate, complete, and unambiguous requirements are desirable for enabling accurate estimates of system development program technical needs and associated schedules and costs.

The different illustrative embodiments also recognize and take into account that establishing accurate and unambiguous requirements presents other technical problems. For example, the different illustrative embodiments recognize and take into account that some current approaches to generating structured requirements may rely on specialized language with unique syntax, key words, and delimiters. Other current systems and methods for generating requirements may lack a useful graphical user interface or require expertise in handling database information. Such approaches may be difficult to use and may require extensive user training.

The different illustrative embodiments also recognize and take into account that current systems and methods for generating requirements do not establish the quality of a requirement in an efficient manner as the requirement is being written. For example, current systems and methods may not allow a writer of requirements to know which parts of a requirement may need to be modified or how a requirement may be changed to improve the quality of the requirement. Therefore, current systems and methods do not provide for establishing the quality of requirements in an efficient manner.

The illustrative embodiments provide a technical solution to the problem of developing items to satisfy requirements. For example, illustrative embodiments provide a system and method for establishing high-quality requirements in an efficient manner. Illustrative embodiments provide structures for establishing requirements and real-time feedback of requirement quality to establish complete, accurate, and unambiguous definitions for characteristics of the items to be developed. Therefore, items that are designed, manufactured, and tested using requirements established in accordance with an illustrative embodiment may satisfy desires and expectations for those items. Illustrative embodiments also provide for establishing requirements using a natural human language. Therefore, intelligible requirements may be established more easily and in less time by persons that need not be trained in the use of specialized mathematical or other formal languages for establishing requirements. By providing for both higher quality and efficiency in establishing requirements for items, items that are developed using requirements established in accordance with an illustrative embodiment may be developed in less time, at less cost, or both.

The illustrative embodiments provide a technical solution to the problem of establishing accurate and unambiguous requirements in an efficient manner. For example, one or more of the illustrative embodiments provides a system and a method for establishing consistently high-quality unambiguous requirements using natural language. A method and an apparatus in accordance with an illustrative embodiment may assist a user to establish the type of a requirement. A method and an apparatus in accordance with an illustrative embodiment may establish a structure for the requirement based on the type of the requirement. The structure for the requirement may define desirable relationships between various elements that should be included in the requirement.

A method and an apparatus in accordance with an illustrative embodiment may establish and display the quality of the individual elements of the requirement and the quality of the requirement as a whole as the requirement is being written. For example, illustrative embodiments may indicate which elements of a requirement may be modified to improve the quality of the requirement and how the indicated elements may be modified to improve the quality of the requirement.

A method and an apparatus in accordance with an illustrative embodiment may use engineering data in a requirements management tool to establish automatically a number of elements of a requirement. A method and an apparatus in accordance with an illustrative embodiment also may provide alerts in response to changes in engineering data related to the elements of a requirement in a requirements management tool. Such alerts may indicate that a requirement should be evaluated for possible modification of the requirement in view of the changes in the engineering data related to the elements of the requirement.

Turning to FIG. 1, an illustration of a block diagram of a requirement generation environment is depicted in accordance with an illustrative embodiment. Requirement generation environment 100 includes requirement generator 102. Requirement generator 102 may be used by operator 104 to establish requirement 106. For example, without limitation, requirement 106 may be a written description of a number of mandatory or other characteristics of an item. For example, the item may be a system, a product, a service, or any appropriate combination of any number of systems, products, or services. For example, without limitation, the item may be an aerospace vehicle such as an aircraft, a portion of an aircraft, or any other appropriate item.

For example, without limitation, operator 104 may be acquirer 108 or supplier 110. Acquirer 108 may use requirement generator 102 to establish requirement 106 for items to be acquired by acquirer 108 from supplier 110. For example, requirement 106 established using requirement generator 102 may be included in a contract or other agreement between acquirer 108 and supplier 110 to describe the items to be provided by supplier 110 to acquirer 108 under the contract or other agreement. In this case, the items provided by supplier 110 to acquirer 108 may be checked against requirement 106 established using requirement generator 102 to determine whether or not the terms of the contract or other agreement have been satisfied.

Supplier 110 may use requirement 106 established by acquirer 108 using requirement generator 102 to manage or control the process for developing items for acquirer 108 that satisfy requirement 106. Alternatively, or additionally, supplier 110 may use requirement generator 102 to establish requirement 106 for use by supplier 110 to manage or control the process for developing items that satisfy requirement 106 for acquirer 108 or for another appropriate entity. For example, without limitation, supplier 110 may use requirement 106 established using requirement generator 102 by acquirer 108 or by supplier 110 to manage or control the design, manufacturing, testing, or any other appropriate part or combination of parts of a process for producing items to satisfy requirement 106.

Requirement 106 established using requirement generator 102 may be used by supplier 110 in requirements management tool 112 to manage or control the development of items that satisfy requirement 106. Requirements management tool 112 may include any appropriate tool that may be configured to enable management and traceability of requirement 106 for the development of items to satisfy requirement 106. Requirements management tool 112 may be used in any appropriate development process or environment to track requirement 106 from inception throughout a project life cycle. Requirements management tool 112 may be used to ensure that requirement 106 gets implemented and that the compliance of items with requirement 106 gets tested prior to project completion. Examples of requirements management tool 112 include, without limitation, Dynamic Object Oriented Requirements System (DOORS), available from International Business Machines, and Teamcenter Systems Engineering (TcSE), available from Siemens.

Some or all of the functions of requirement generator 102 as described herein may be implemented in hardware or in a combination of hardware and software in computer system 114. Computer system 114 may be a single computer or any appropriate number of computers that may be configured to operate together in any appropriate network configuration to perform some or all of the functions of requirement generator 102 as described herein. Computer system 114 may comprise any appropriate device or combination of devices that may be configured to perform some or all of the functions of requirement generator 102 as described herein.

Requirements management tool 112 may be implemented on computer system 114 along with requirement generator 102 or may be implemented separately from requirement generator 102. For example, without limitation, all or part of requirement generator 102 may be implemented as part of requirements management tool 112. In this case, some or all of the functions provided by requirement generator 102 as described herein may be implemented on computer system 114 using a programming functionality provided by requirements management tool 112.

Requirement 106 may be established in natural language 116 by operator 104 using requirement generator 102. For example, without limitation, requirement 106 may be established in the form of a statement comprising words 117 in natural language 116. Natural language 116 is a language used by humans to communicate with each other. Natural language 116 also may be referred to as an ordinary language. Natural language 116 is any language which arises in an unpremeditated fashion as a result of the innate facility for language possessed by the human intellect. Natural language 116 is distinguished from constructed languages and formal languages, such as computer-programming languages. For example, without limitation, natural language 116 may be English or another natural language.

Type 118 of requirement 106 may be identified by operator 104 using requirement generator 102. Requirement generator 102 may be configured to establish structure 119 and elements 120 for requirement 106 based on type 118 of requirement 106 identified using requirement generator 102. Requirement 106 may comprise a combination of elements 120. Structure 119 for requirement 106 may define an appropriate arrangement of elements 120 or other relationships or combinations of relationships between elements 120 for an identified type 118 of requirement 106. Various appropriate characteristics of individual elements 120 for requirement 106 may be defined by type 118 of requirement 106. For example, without limitation, one or more elements 120 may be optional for an identified type 118 of requirement 106.

Elements 120 for requirement 106 may comprise one or more words or phrases in natural language 116. The arrangement of words within elements 120 for requirement 106 may conform to the rules of grammar for natural language 116.

Elements 120 may be combined in an appropriate order and separated by appropriate words, phrases, punctuation, or appropriate combinations thereof, to form requirement 106. The appropriate order for elements 120 in requirement 106 and the appropriate words, phrases, punctuation, or combinations thereof for separating elements 120 in requirement 106 may be defined by structure 119 for requirement 106. Structure 119 for requirement 106 also may conform to the rules of grammar for natural language 116.

Requirement generator 102 may include user interface 124. For example, without limitation, user interface 124 may comprise a graphical user interface. User interface 124 may include displays 126 and may be configured to receive user input 128. Displays 126 may be displayed to operator 104 on user interface system 130. User interface 124 may be configured to receive user input 128 from operator 104 via user interface system 130.

User interface system 130 may be a part of computer system 114 on which requirement generator 102 is implemented or may be separate from but connected to computer system 114 on which requirement generator 102 is implemented. User interface system 130 may include a display device, such as a computer monitor or other appropriate display device, on which displays 126 of user interface 124 may be displayed. User interface system 130 may include an input device, such as a keyboard, a mouse, a touch pad, other appropriate input device, or any appropriate combination of input devices for receiving user input 128 from operator 104. For example, without limitation, user interface system 130 may comprise a touch screen display or other appropriate device that may be configured both for presenting displays 126 of user interface 124 and for receiving user input 128 to user interface 124.

Requirement generator 102 may comprise type identifier 132, requirement formatter 134, and quality assessor 138. Type identifier 132, requirement formatter 134, and quality assessor 138 may be implemented as parts of requirement generator 102 in hardware, in software, or using a combination of hardware and software. Type identifier 132, requirement formatter 134, and quality assessor 138 may be configured to receive user input 128 from operator 104 via user interface 124 and to provide information to operator 104 via displays 126 on user interface 124.

Type identifier 132 may be configured to identify type 118 of requirement 106 established using requirement generator 102. For example, type identifier 132 may be configured to provide displays 126 that are configured to prompt and assist operator 104 to identify type 118 of requirement 106 to be established using requirement generator 102. Type identifier 132 also may be configured to receive user input 128 from operator 104 for identifying type 118 of requirement 106 to be established using requirement generator 102.

Requirement formatter 134 may be configured to establish structure 119 and elements 120 for requirement 106 established using requirement generator 102. For example, without limitation, requirement formatter 134 may be configured to establish structure 119 for requirement 106 based on type 118 of requirement 106 as identified by type identifier 132. Requirement formatter 134 may be configured to provide displays 126 of structure 119 for requirement 106. For example, requirement formatter 134 may be configured to provide displays 126 of structure 119 for requirement 106 that may include fields that are configured to prompt operator 104 to establish appropriate elements 120 for requirement 106. Requirement formatter 134 also may be configured to receive user input 128 from operator 104 for establishing elements 120 for requirement 106.

Requirements management tool 112 may include engineering data 139 related to a number of elements 120 of requirement 106. Engineering data 139 may include any appropriate information related to the implementation of elements 120 of requirement 106. Engineering data 139 may be stored in requirements management tool 112. Alternatively, or in addition, engineering data 139 may be stored in a location or manner that is not part of requirements management tool 112 but that may be accessed by requirements management tool 112, requirement generator 102, or both, to obtain engineering data 139.

Requirement formatter 134 may be configured to use engineering data 139 related to a number of elements 120 of requirement 106 to establish automatically a number of elements 120 of requirement 106. For example, requirement formatter 134 may be configured to use engineering data 139 related to a number of elements 120 of requirement 106 to provide suggested appropriate wording for a number of elements 120 of requirement 106. Elements 120 of requirement 106 that are established automatically by requirement formatter 134 using engineering data 139 related to elements 120 may be modified by operator 104 via user input 128.

Requirement formatter 134 also may be configured to identify changes in engineering data 139 related to elements 120 of requirement 106 that have already been established. Requirement formatter 134 may be configured to provide displays 126 on user interface 124 that may include appropriate alerts in response to identifying changes in engineering data 139 related to elements 120 of requirement 106. For example, such alerts may be configured to prompt operator 104 to evaluate elements 120 of requirement 106 for possible modification of elements 120 in view of the changes in engineering data 139 related to elements 120.

Quality assessor 138 may be configured to establish quality level 140 for each of elements 120 of requirement 106. Quality assessor 138 also may be configured to establish quality level 140 for requirement 106. For example, quality assessor 138 may be configured to establish quality level 140 for requirement 106 based on quality level 140 for elements 120 of requirement 106.

Quality level 140 may indicate the degree to which requirement 106 or elements 120 of requirement 106 are accurate, complete, and clear. For example, quality level 140 may indicate the degree to which requirement 106 or elements 120 of requirement 106 clearly express mandatory characteristics or other characteristics of items. Using requirement 106 having a higher quality level 140 to describe the characteristics of items may reduce the risk of miscommunication between and among acquirer 108 and supplier 110 of the items. It may be easier to check items against requirement 106 having a higher quality level 140 as the items are being developed. It also may be easier to determine whether items satisfy requirement 106 when the items are delivered if requirement 106 has a higher quality level 140. In general, using requirement 106 having a higher quality level 140 to describe the characteristics of items is more likely to result in items that satisfy desires and expectations.

For example, without limitation, quality assessor 138 may be configured to establish quality level 140 for each of elements 120 of requirement 106 by evaluating the words in each of elements 120 using quality criteria 141. In other words, quality criteria 141 may be used to associate the words in elements 120 of requirement 106 with quality level 140. Quality criteria 141 also may be used by quality assessor 138 to establish quality level 140 for requirement 106.

Quality criteria 141 may be defined using any appropriate standard or other method for establishing quality level 140 for requirement 106, for elements 120 of requirement 106, or for both requirement 106 and elements 120 of requirement 106. For example, without limitation, quality criteria 141 may define quality level 140 for elements 120 of requirement 106 based on whether or not certain words in elements 120 are missing or present and whether or not the words that are present in elements 120 are correct.

Quality criteria 141 may be expressed and saved in any appropriate manner and format for use by quality assessor 138. For example, quality criteria 141 may be saved in any appropriate database or data structure in computer system 114 or in any other location or combination of locations from which quality assessor 138 may access quality criteria 141.

Quality criteria 141 for establishing quality level 140 for requirement 106 and for elements 120 of requirement 106 may be defined based on type 118 of requirement 106. Different quality criteria 141 may be defined for different types of requirements. Therefore, quality assessor 138 may be configured to select quality criteria 141 that will be used by quality assessor 138 to establish quality level 140 for requirement 106 and for elements 120 of requirement 106 based on type 118 of requirement 106 as identified by type identifier 132.

For example, without limitation, quality level 140 for requirement 106 may be established based on quality level 140 for elements 120 of requirement 106 by combining quality level 140 for elements 120 of requirement 106. For example, without limitation, quality level 140 for requirement 106 may be established as the average of quality level 140 for elements 120 of requirement 106. As another example, quality level 140 for requirement 106 may be established as a weighted average of quality level 140 for elements 120 of requirement 106 using appropriate weightings for quality level 140 for elements 120. Quality level 140 for elements 120 of requirement 106 may affect quality level 140 for requirement 106 in various different ways or to various different degrees. The weightings for quality level 140 for elements 120 that may be used to establish quality level 140 for requirement 106 may identify the relative effects of quality level 140 for elements 120 of requirement 106 on quality level 140 for requirement 106.

The weightings for quality level 140 for elements 120 that are used by quality assessor 138 to establish quality level 140 for requirement 106 may be fixed. For example, the weightings may be fixed based on type 118 of requirement 106. Alternatively, the weightings for quality level 140 for elements 120 that are used to establish quality level 140 for requirement 106 may be adjustable by operator 104. For example, quality assessor 138 may be configured to provide displays 126 on user interface 124 for prompting operator 104 to enter or select the weightings for quality level 140 for elements 120 that will be used by quality assessor 138 to establish quality level 140 for requirement 106. In this case, the weightings for quality level 140 for elements 120 that will be used to establish quality level 140 for requirement 106 may be received by quality assessor 138 as user input 128 from operator 104 via user interface 124.

Quality level 140 for requirement 106 and for elements 120 of requirement 106 as established by quality assessor 138 may be represented in any appropriate manner or form or in various different appropriate manners and forms. For example, without limitation, quality level 140 for requirement 106, for elements 120 of requirement 106, or for both requirement 106 and elements 120 of requirement 106, may be represented by an alphanumeric quality score 142. For example, score 142 may represent quality level 140 as a number or letter selected from a range of numbers or letters wherein each number or letter in the range of numbers or letters corresponds to a different level of quality for requirement 106 or for elements 120 of requirement 106. Score 142 may be selected from a range of scores comprising at least three different scores corresponding to at least three different levels of quality for requirement 106, for elements 120 of requirement 106, or for both requirement 106 and elements 120 of requirement 106.

In this case, quality level 140 may be represented in a manner so as to indicate various gradations for the level of quality for requirement 106, for elements 120 of requirement 106, or for both requirement 106 and elements 120 of requirement 106. In other words, quality level 140 may be represented in a manner so as to indicate more than merely that the level of quality for requirement 106, for elements 120 of requirement 106, or for both requirement 106 and elements 120 of requirement 106, is either good or bad or pass or fail.

Quality assessor 138 may be configured to provide displays 126 on user interface 124 for providing an indication to operator 104 of quality level 140 for requirement 106, for elements 120 of requirement 106, or for both requirement 106 and elements 120 of requirement 106. Such displays 126 may include an indication of why quality level 140 was established for requirement 106, for elements 120 of requirement 106, or for both requirement 106 and elements 120 of requirement 106. Alternatively, or additionally, such displays 126 may include a number of suggestions for improving quality level 140 for requirement 106, for elements 120 of requirement 106, or for both requirement 106 and elements 120 of requirement 106.

For example, without limitation, quality assessor 138 may be configured to establish and display quality level 140 for requirement 106, for elements 120 of requirement 106, or for both requirement 106 and elements 120 of requirement 106 as operator 104 is using requirement generator 102 to establish elements 120 for requirement 106. By establishing and displaying quality level 140 in this manner, as elements 120 of requirement 106 are being established, operator 104 may be able to identify elements 120 of requirement 106 that affect quality level 140 of requirement 106 in an undesired way and may be able to modify those elements 120 to increase quality level 140 for requirement 106 in a more effective and efficient manner.

Requirement generator 102 also may be configured to establish security classification 144 for requirement 106. For example, requirement generator 102 may be configured to provide displays 126 on user interface 124 for prompting operator 104 to identify security classification 144 for elements 120 of requirement 106. In this case, security classification 144 for elements 120 of requirement 106 may be received by requirement generator 102 as user input 128 from operator 104 via user interface 124. Requirement generator 102 may be configured to establish security classification 144 for requirement 106 based on security classification 144 for elements 120 of requirement 106 as identified by operator 104. Requirement generator 102 may be configured to provide an indication of security classification 144 for requirement 106 via one or more displays 126 on user interface 124 or in any other appropriate manner.

For example, without limitation, security classification 144 for requirement 106 may be established automatically by requirement generator 102 as the highest security classification 144 for any of elements 120 of requirement 106 as identified by operator 104. In some cases, however, the combination of elements 120 of requirement 106 may call for security classification 144 for requirement 106 that is higher than security classification 144 for any one of elements 120 of requirement 106.

In these cases, operator 104 may override security classification 144 for requirement 106 as automatically established by requirement generator 102 to establish a higher security classification 144 for requirement 106. For example, such security classification 144 for requirement 106 may be established by operator 104 via user input 128. In any case, security classification 144 for requirement 106 and security classification 144 for elements 120 of requirement 106 may be defined with reference to a security classification guide for the project for which requirement 106 is being established using requirement generator 102.

Requirement 106 established using requirement generator 102 may be provided as an output from requirement generator 102 in any appropriate format or in various different appropriate formats. For example, without limitation, requirement 106 may be provided as an output from requirement generator 102 to requirements management tool 112 in an appropriate format for use by requirements management tool 112. Alternatively, or in addition, requirement 106 may be provided as an output from requirement generator 102 in an appropriate format for use in an electronic spreadsheet program, such as Excel or any other appropriate electronic spreadsheet program. Alternatively, or in addition, requirement 106 may be provided as an output from requirement generator 102 in a text file format for use by a word processor or other computer program.

Requirement 106 established using requirement generator 102 may be saved by requirement generator 102 in any appropriate manner and format. For example, requirement 106 may be saved in any appropriate database or data structure in computer system 114 or in any other appropriate location or combination of locations. Requirement generator 102 may be used both to establish a new requirement and to modify an existing established requirement. For example, requirement 106 that has been established and saved by requirement generator 102 later may be retrieved by requirement generator 102 for modification using requirement generator 102.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 2:
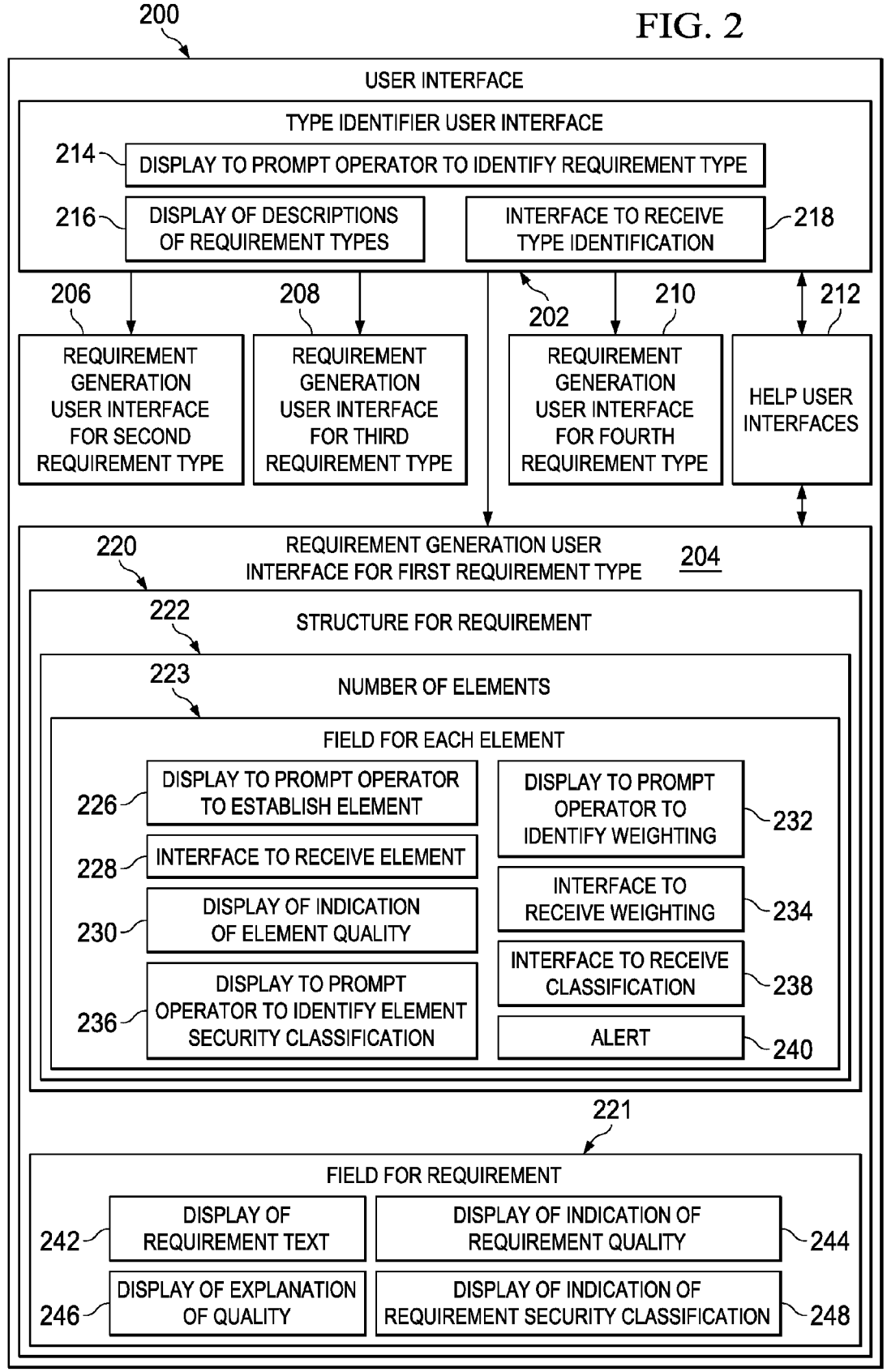
FIG. 2 is an illustration of a block diagram of a user interface in accordance with an illustrative embodiment.

Turning to FIG. 2, an illustration of a block diagram of a user interface is depicted in accordance with an illustrative embodiment. In this example, user interface 200 may be an example of one implementation of user interface 124 for requirement generator 102 in FIG. 1.

User interface 200 may include type identifier user interface 202, requirement generation user interfaces 204, 206, 208, 210, and help user interfaces 212. A user interface in accordance with an illustrative embodiment may include more or fewer user interfaces and displays. For example, without limitation, a user interface in accordance with an illustrative embodiment may include more or fewer than four requirement generation user interfaces. Furthermore, a user interface in accordance with an illustrative embodiment may include other user interfaces, displays, or various combinations of user interfaces and displays.

Type identifier user interface 202 may be an example of one implementation of a user interface that may be provided by type identifier 132 for identifying type 118 of requirement 106 in FIG. 1. Type identifier user interface 202 may include display to prompt operator to identify requirement type 214, display of descriptions of requirement types 216, and interface to receive type identification 218. For example, without limitation, display to prompt operator to identify requirement type 214 may prompt an operator to select the type of a requirement to be established from among a number of different types of requirements.

Display of descriptions of requirement types 216 may be configured to assist the operator in selecting the type of the requirement to be established. For example, without limitation, display of descriptions of requirement types 216 may include descriptions of various characteristics of various different types of requirements that may be selected. Interface to receive type identification 218 may be configured to receive the identification of the type of the requirement to be established from the operator. For example, without limitation, interface to receive type identification 218 may be configured to receive the selection of a type of the requirement to be established from the operator.

An appropriate one of requirement generation user interface for first requirement type 204, requirement generation user interface for second requirement type 206, requirement generation user interface for third requirement type 208, or requirement generation user interface for fourth requirement type 210 may be provided in response to the identification of the type of a requirement to be established that was made by the operator via type identifier user interface 202. Each of requirement generation user interface for first requirement type 204, requirement generation user interface for second requirement type 206, requirement generation user interface for third requirement type 208, and requirement generation user interface for fourth requirement type 210 may correspond to a different type of requirement that may be established. User interface 200 may include more or fewer than four requirement generation user interfaces, depending on the number of different types of requirement that may be established.

Requirement generation user interface for first requirement type 204 may be an example of one implementation of a user interface that may be provided by requirement formatter 134 and quality assessor 138 for displaying structure 119 of requirement 106, establishing elements 120 for requirement 106, and displaying quality level 140 for requirement 106 and for elements 120 of requirement 106 in FIG. 1. Requirement generation user interface for first requirement type 204 may indicate structure for requirement 220 as defined for the first requirement type and may include field for requirement 221.

Structure for requirement 220 may indicate number of elements 222 for the first requirement type, various characteristics of number of elements 222, and relationships between number of elements 222. For example, without limitation, structure for requirement 220 may indicate one or more of an order or other arrangement for number of elements 222, whether any of number of elements 222 may be optional, words, phrases, or punctuation separating or linking number of elements 222, or other characteristics of number of elements 222 or of relationships between number of elements 222. The various characteristics of structure for requirement 220 and of number of elements 222 may comply with the rules of grammar for a natural language.

Structure for requirement 220 may be indicated by the order or other arrangement in requirement generation user interface for first requirement type 204 of field for each element 223 corresponding to each element in number of elements 222. In other words, field for each element 223 for each element in number of elements 222 may be arranged in requirement generation user interface for first requirement type 204 in a manner to indicate structure for requirement 220 for the first requirement type.

Field for each element 223 may include display to prompt operator to establish element 226 and interface to receive element 228. Display to prompt operator to establish element 226 may be configured to prompt an operator to enter or to select one or more words to establish an element of the requirement. Interface to receive element 228 may be configured to receive the words entered or selected by the operator to establish the element.

Field for each element 223 also may include display of indication of element quality 230. The quality level for an element of a requirement may indicate the degree to which the element of the requirement is accurate, complete, and clear. The quality level for an element of a requirement may be established by evaluating the words of the element using quality criteria. Display of indication of element quality 230 may be configured to provide an indication of the quality level for the element. Any appropriate indication of the quality level for the element may be provided in display of indication of element quality 230. For example, without limitation, the indication of the quality level for the element in display of indication of element quality 230 may include a number, letter, color, shape, words, or any other appropriate indicator or combination of indicators for indicating the quality level for the element.

The quality level for a requirement may be established based on the quality levels for various individual elements of the requirement. For example, without limitation, the quality level for a requirement may be established by combining the quality levels for individual elements of the requirement using appropriate weightings for the quality levels for the elements. The quality levels for the various elements of a requirement may affect the quality level for the requirement as a whole in various different ways or to various different degrees. The weightings for the quality levels for the elements that are used to establish the quality level for the requirement may identify the relative effects of the quality levels for various elements of a requirement on the quality level for the requirement as a whole.

The weightings for the quality levels for the elements of a requirement that may be used to establish a quality level for the requirement may be adjustable by an operator. For example, field for each element 223 may include display to prompt operator to identify weighting 232 and interface to receive weighting 234. For example, without limitation, display to prompt operator to identify weighting 232 may be configured to prompt an operator to enter or select the weighting that is to be used for the quality level for the element when the quality level for the element is used to establish the quality level for the requirement. Interface to receive weighting 234 may be configured to receive the weighting for the quality level for the element identified by the operator.

Field for each element 223 also may include display to prompt operator to identify element security classification 236 and interface to receive classification 238. Display to prompt operator to identify element security classification 236 may be configured to prompt an operator to select or otherwise identify a security classification for the element. For example, without limitation, display to prompt operator to identify element security classification 236 may prompt the operator to select one from among a number of possible security classifications for the element. Interface to receive classification 238 may be configured to receive the identification of the security classification for the element from the operator.

Field for each element 223 also may include alert 240. For example, alert 240 may be provided in any appropriate form to indicate to an operator that the element should be evaluated for possible modification. For example, without limitation, alert 240 may be provided in response to a change in engineering data related to the element in a requirements management tool.

The field for each element for any particular element of a requirement may include more, fewer, or various combinations of different displays and interfaces. For example, a quality level may not be established for a particular element of a requirement. In this case, the field for the element may not include display of indication of element quality 230, display to prompt operator to identify weighting 232, and interface to receive weighting 234. As another example, a particular element of a requirement may not have an individual element security classification. In this case, the field for the element may not include display to prompt operator to identify element security classification 236 and interface to receive classification 238.

Field for requirement 221 may include display of requirement text 242. Display of requirement text 242 may be configured to display the natural language wording of the requirement. Display of requirement text 242 may be formed from the words of the elements of the requirement as entered or selected by an operator via field for each element 223 for each of the elements of the requirement.

Field for requirement 221 may include display of indication of requirement quality 244. The quality level for a requirement may indicate the degree to which the requirement is accurate, complete, and clear. A level of quality for the requirement may be established based on the levels of quality for various elements of the requirement. Display of indication of requirement quality 244 may be configured to display an indication of the quality level for the requirement in any appropriate form. For example, without limitation, the indication of the quality level for the requirement in display of indication of requirement quality 244 may include a number, a letter, a color, a shape, words, or any other appropriate indicator or combination of indicators for indicating the quality level for the requirement. The type of indicator used to indicate the level of quality for the requirement in display of indication of requirement quality 244 may be the same as or different from the type of indicator used to indicate the level of quality for an element of the requirement in display of indication of element quality 230.

Field for requirement 221 also may include display of explanation of quality 246. Display of explanation of quality 246 may be configured to display reasons why the quality level for the requirement as indicated in display of indication of requirement quality 244 has been established. For example, without limitation, display of explanation of quality 246 may be configured to identify a number of the elements of the requirement that may be changed to improve the quality level for the requirement. Display of explanation of quality 246 also may be configured to identify ways in which a number of the elements of the requirement may be changed to improve the quality level for the requirement. A display of an explanation of the quality level for an element of a requirement also or alternatively may be part of field for each element 223 for the corresponding element. Similarly, a display identifying ways in which an element of a requirement may be changed to improve the quality level for the element also or alternatively may be part of field for each element 223 for the corresponding element. In any case, display of explanation of quality 246 may allow an operator to identify quickly which elements of a requirement may be changed to improve the quality level for the requirement and how those elements may be changed to improve the quality level for the requirement.

Field for requirement 221 also may include display of indication of requirement security classification 248. The security classification for the requirement may be established based on the security classifications for the elements of the requirement as selected or otherwise entered by an operator in field for each element 223. Display of indication of requirement security classification 248 may be configured to display an indication of the security classification for the requirement in any appropriate form. For example, the indication of the security classification for the requirement in display of indication of requirement security classification 248 may include a number, a letter, a color, a shape, words, or any other appropriate indicator or combination of indicators for indicating the security classification for the requirement.

Display of indication of requirement security classification 248 also may be configured to receive an indication of the security classification for the requirement from an operator. For example, without limitation, the security classification for a requirement may be established automatically as the highest security classification for any of the elements of the requirement as identified by an operator. An indication of the automatically established security classification for the requirement then may be displayed in display of indication of requirement security classification 248. In some cases, however, the combination of elements of the requirement may call for a security classification for the requirement that is higher than the highest security classification for any one of the elements of the requirement. In this case, the operator may use display of indication of requirement security classification 248 to establish manually the appropriate security classification for the requirement.

Requirement generation user interface for second requirement type 206, requirement generation user interface for third requirement type 208, and requirement generation user interface for fourth requirement type 210 may be similar to requirement generation user interface for first requirement type 204. For example, each of requirement generation user interface for first requirement type 204, requirement generation user interface for second requirement type 206, requirement generation user interface for third requirement type 208, and requirement generation user interface for fourth requirement type 210 may indicate a structure for a requirement and include fields for each element of the requirement and a field for the requirement. However, the characteristics of the structure and elements for a requirement may be different for different types of requirements. Therefore, various characteristics of the structure for the requirement and of the fields for each element and for the requirement in requirement generation user interface for first requirement type 204, requirement generation user interface for second requirement type 206, requirement generation user interface for third requirement type 208, and requirement generation user interface for fourth requirement type 210 may be different and may depend upon the particular type of requirement to be established using the particular requirement generation user interface.

Help user interfaces 212 may be configured to provide appropriate information to help an operator to use other displays and interfaces in user interface 200. Help user interfaces 212 may be associated with any appropriate ones of the other displays and interfaces in user interface 200. For example, without limitation, a number of the displays, interfaces, or both displays and interfaces in user interface 200 may include indicators for indicating to an operator that corresponding help user interfaces 212 are available. An appropriate one of help user interfaces 212 comprising information for using the corresponding display or interface may be provided in response to the operator selecting the indicator on the display or interface.

Turning to FIG. 3, an illustration of a block diagram of a requirement is depicted in accordance with an illustrative embodiment. In this example, requirement 300 may be an example of one implementation of requirement 106 in FIG. 1.

Requirement 300 may be defined by type 302 and may comprise structure 303 and elements 304. Type 302 of requirement 300 may define various characteristics of structure 303 and elements 304 for requirement 300. For example, without limitation, type 302 of requirement 300 may define mandatory and optional elements 304 for requirement 300. Type 302 of requirement 300 also may define the relationships between elements 304 of requirement 300 that define structure 303 for requirement 300. For example, without limitation, type 302 of requirement 300 may comprise functional/performance requirement 306, design requirement 308, environmental requirement 310, suitability requirement 311, or any appropriate other type 312 of requirement.

Functional/performance requirement 306 may describe functional behavior and performance behavior at the boundary of an item performing a required action or function. Functional/performance requirement 306 may define the input/output transformations at the boundary of the item. For example, functional/performance requirement 306 may define the output response of the item to some input trigger or system state condition, both observable at the item boundary.

Design requirement 308 may describe how to design or fabricate an item or its elements. Design requirement 308 may express mandatory characteristics concerning how to make an item, thereby constraining the design or fabrication of the item or its elements. Design requirement 308 may capture lessons learned to achieve desired performance by using proven design solutions. Design requirement 308 may address non-boundary items, such as parts, materials, and processes, and may provide a replacement for more complicated performance requirements. Design requirement 308 may result from prior experience with similar systems when a developer is to include a particular feature in the design solution. Design requirement 308 may include mandates on the use of specific legacy or other non-developmental items.

Environmental requirement 310 may describe the exposed or generated environment through which an item must survive or function for all or part of its life cycle. For example, elements 304 of environmental requirement 310 may specify the physical, radiant, chemical, and biotic factors that may surround and affect the item. Examples of such factors may include, without limitation, humidity, temperature, electromagnetic interference, pressure, sand spray, salt spray, or other factors or various combinations of factors.

Suitability requirement 311 may describe the safety, security, reliability, availability, maintainability, or other health characteristics of an item. Suitability requirement 311 may also specify the allowable effect that the item may generate on the external environment. Suitability requirement 311 may describe the degree to which an item may be placed satisfactorily in field use, with consideration given to availability, compatibility, transportability, interoperability, reliability, wartime use rates, maintainability, full-dimension protection, operational safety, human factors, architectural and infrastructure compliance, manpower supportability, logistics supportability, natural environmental effects and impacts, document and training requirements, or other considerations or various combinations of considerations.

Structure 303 for requirement 300 may be defined by type 302 of requirement 300. Structure 303 for requirement 300 may define an appropriate arrangement of elements 304 for requirement 300 or other relationships or combinations of relationships between elements 304 of requirement 300. For example, without limitation, structure 303 for requirement 300 may comply with the rules of grammar for a natural language.

Elements 304 of requirement 300 may comprise words 313 that describe various characteristics of an item described by requirement 300. For example, without limitation, elements 304 of requirement 300 may comprise words 313 in a natural language.

Characteristics of elements 304 of requirement 300 may be defined by type 302 of requirement 300. For example, without limitation, elements 304 of requirement 300 may include one or more of agent 314, shall statement 316, function 318, interface-output 320, performance 322, condition 324, event trigger 326, interface-input 327, timing 328, design constraint 330, characteristic 332, environment exposure 334, duration 336, or any other elements 338 for describing various characteristics of the item described by requirement 300.

Agent 314 may identify an item performing an action or function or possessing a characteristic. Shall statement 316 may be used to link agent 314 with the actions or functions performed by agent 314 or other characteristics of agent 314. Shall statement 316 may identify the extent to which the characteristics of agent 314 may be mandatory or contractually binding. For example, without limitation, shall statement 316 may be selected from "shall," "may," "will," "should" or other similar words or phrases, such as "must". In this example, "shall" may indicate a characteristic that is binding. "Must" may be synonymous with "shall". "May" and "will" may indicate non-mandatory characteristics. "May" may indicate permission. "Will" may be used to express a declaration of purpose or intent. "Should" may indicate non-mandatory goals or objectives.

Function 318 may describe the action or behavior of agent 314. Function 318 may describe what agent 314 does that is observable at its boundary. Interface-output 320 may identify the location where function 318 may be observed and evaluated and associated constraints. For example, without limitation, interface-output 320 may include an interface definition.

Performance 322 may be a measurable attribute of a function or design attribute which enables the determination of success or failure during verification of an item against requirement 300. Performance 322 may be quantitative. Performance 322 may describe the degree to which an application, a system, or a component accomplishes its designed functions within given constraints, such as speed, accuracy, or memory usage.

Condition 324 may describe the circumstances under which agent 314 is to perform an action or function. Condition 324 may include states, modes, environments, limitations, special conditions, configurations, or combinations thereof which may affect or limit the applicability of requirement 300. A state or mode is a condition or combination of conditions that occurs under defined circumstances.

Event trigger 326 may define events observable at the boundary of agent 314 which initiate functions. Event trigger 326 may include system state transitions. Interface-input 327 may identify a location where an initiating event may be observed and evaluated and associated constraints. For example, without limitation, interface-input 327 may include an interface definition. Timing 328 may comprise a statement of how soon or how long is necessary for behavior associated with state changes and trigger conditions.

Design constraint 330 may comprise a statement of a limitation on the design of agent 314. Characteristic 332 may describe agent 314 while an environment is applied. Environment exposure 334 may comprise a description of the environment that agent 314 may be exposed to. Duration 336 may describe the temporal extent to which a condition or environment may be applied to agent 314.

Turning to FIG. 4, an illustration of a block diagram of quality criteria is depicted in accordance with an illustrative embodiment. In this example, quality criteria 400 may be an example of one implementation of quality criteria 141 in FIG. 1.

Quality criteria 400 may be used to establish quality levels for elements of a requirement. Quality criteria 400 may be defined for the specific requirement type 402 of the requirement and the specific element fields 404 for the elements of the requirement to which quality criteria 400 are applied to establish the quality level for the elements. For example, without limitation, the words in one of element fields 404 comprising one element of a requirement may be evaluated using criteria 406 that are defined for requirement type 402 of the requirement and the one of element fields 404. Criteria 406 for evaluating the words in one of element fields 404 may take into account words in one or more other element fields 404 of the requirement or other appropriate information.

Result 408 of the evaluation of the words in one of element fields 404 using criteria 406 may establish the quality level for an element of the requirement. Result 408 of the evaluation of the words in the one of element fields 404 using criteria 406 may be provided in the form of score 410. For example, without limitation, score 410 may comprise an alphanumeric value or other appropriate indication of the level of quality for an element in one of element fields 404. Score 410 preferably may be selected from a range of scores comprising at least three different scores corresponding to at least three different levels of quality. In this case, score 410 may indicate various gradations for the level of quality for an element of a requirement. In other words, score 410 may indicate more than merely that the level of quality for the element of the requirement is either good or bad or pass or fail.

An example of quality criteria 400 that may be used to establish the quality level for an element of a requirement is now presented without limiting the scope of illustrative embodiments. The following example is not intended to represent actual quality criteria 400. Rather, the following example is provided to show only one possible example of the types of information that may be considered in quality criteria 400, the form of quality criteria 400, and the relationship between criteria 406 and result 408 in quality criteria 400. Quality criteria 400 in accordance with illustrative embodiments may or may not use the types of information used in the following example or the form of the quality criteria in this example. Illustrative embodiments may establish the quality level for an element of a requirement using quality criteria 400 that may be different in form, substance, or both form and substance from the following example.

The quality criteria in the following example may be an example of one implementation of quality criteria for establishing the level of quality for a function element of a functional/performance requirement. Therefore, the quality criteria in the following example may be an example of quality criteria 400 for a function element field in element fields 404 for a requirement of functional/performance requirement type 402. The quality criteria in the following example may comprise examples of criteria 406 that may be applied to the words in the function element of the functional/performance requirement and of result 408 when the words in the function element of the functional/performance requirement satisfy criteria 406. In the following example, result 408 of applying criteria 406 to the words in the function element of the functional/performance requirement may establish the level of quality for the function element in the functional/performance requirement.

Examples of criteria 406 and corresponding result 408 in quality criteria 400 for establishing the level of quality for a function element of a functional/performance requirement may include the following:

Criterion: If ["Function"=null] or ["Function" contains 'word 1' or 'word 2']. Result: Function element score=0.

Criterion: If "Function" contains ("word 3" or "word 4" or "word 5" or any words in words list). Result: Function element score=1.

Criterion: If ["Interface-Output"=null] and ["Function"≠null (nor ("Function" contains any words in words list)) or [none of the other criteria apply]. Result: Function element score=2.

Criterion: If "Interface-Output" contains ("word 6" or "word 7" or "phrase 1"). Result: Function element score=3.

Criterion: If "Interface-Output" contains [("word 6" or "word 7" or "phrase 1") and ("word 8" or "word 9" or "word 10" or "word 11")]. Result: Function element score=4.

This illustrative example of quality criteria 400 shows that criteria 406 for establishing the quality level for an element of a requirement may take into account both the characteristics of the words in one or more element fields 404 of the requirement as well as whether or not words are missing in one or more element fields 404 of the requirement.

This illustrative example of quality criteria 400 also shows that criteria 406 for establishing the quality level for one element of a requirement may take into account words, or the lack of words, in element fields 404 for other elements of the requirement. For example, in this illustrative example, criteria 406 for establishing a quality level for a function element of a requirement take into account words in the function element of the requirement as well as words in an interface-output element of the requirement.

This illustrative example of quality criteria 400 also shows that criteria 406 for establishing the quality level for an element of a requirement may include other information that may be used to establish the quality level for the element of the requirement that may be referred to by criteria 406 but that may not be included explicitly in criteria 406. In this case, other information that may be used to establish the quality levels for various elements of a requirement using various criteria 406 may be changed without changing each individual one of the various criteria 406. Other information that may be used to establish the quality level for an element of a requirement may be referred to in criteria 406 for establishing the quality level for the element in an appropriate manner to identify the location from which the other information may be obtained or in any other appropriate manner. For example, in this illustrative example, other information that may be used to establish the quality level for an element of a requirement using criteria 406 may include a words list that is referred to in criteria 406. For example, without limitation, the words list referred to in the illustrative examples of criteria 406 may include words that should not be used in a requirement, because the use of such words in a requirement may make the requirement ambiguous or for some other reason or for various combinations of reasons.

The relationship between criteria 406 and result 408 in the illustrative example of quality criteria 400 is in the form of an if-then statement. The illustrative example of quality criteria 400 for establishing a quality level for an element of a requirement comprises a series of such if-then statements. In the illustrative example, if the words in one or more element fields 404 for the requirement satisfy one of criteria 406, then result 408 corresponding to the satisfied one of criteria 406 may establish the quality level for the element of the requirement.

In the illustrative example, result 408 of the evaluation of the element of the requirement using criteria 406 is provided in the form of a numerical score 410 in the range of 0 to 4. Score 410 therefore may provide a numerical indication of the quality level for the element of the requirement. In the illustrative example, a lower numerical score 410 for the element may indicate greater ambiguity in the element and, therefore, lower quality. A higher numerical score 410 for the element may indicate less ambiguity in the element and, therefore, higher quality.

Figure 5:
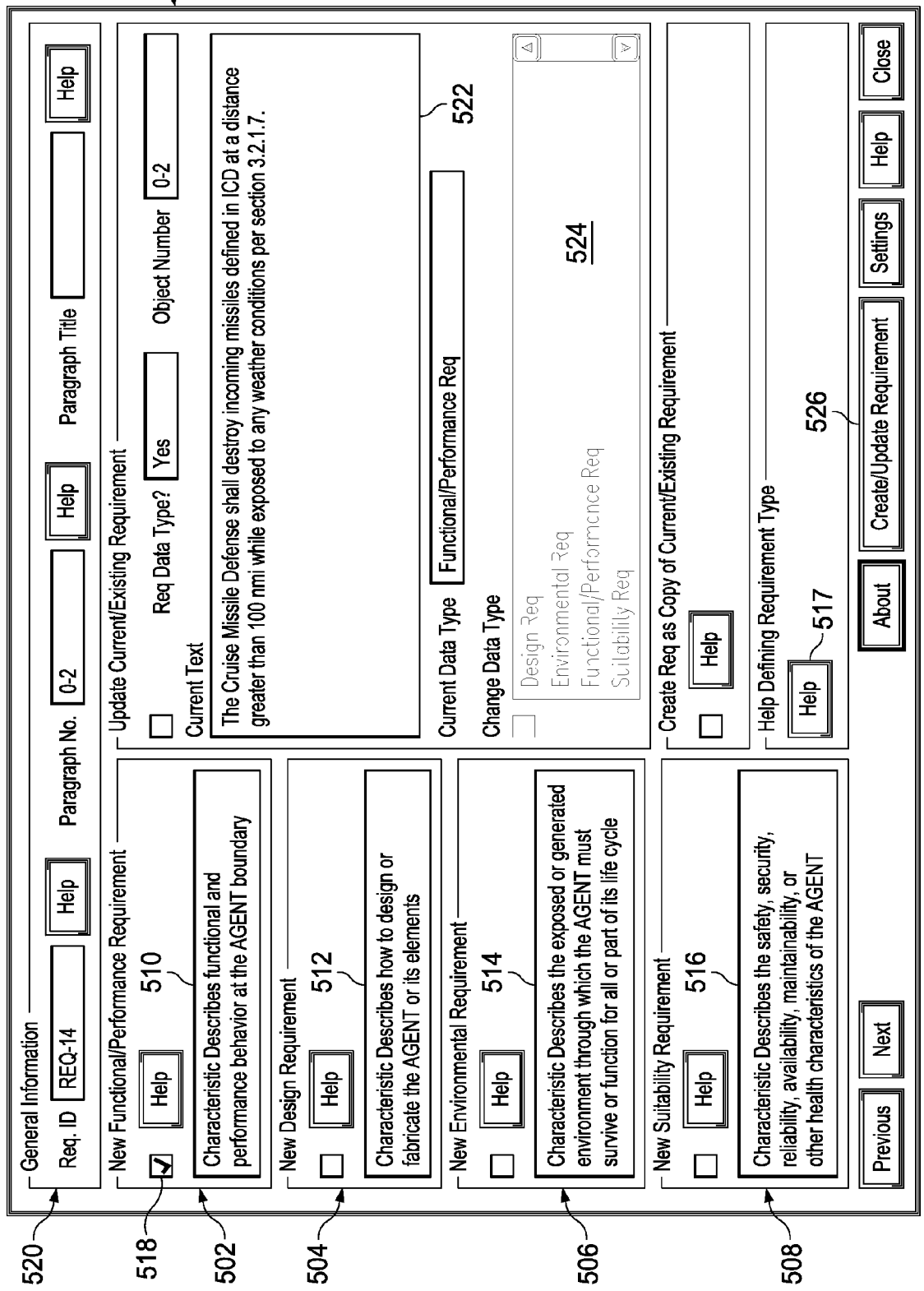
FIG. 5 is an illustration of a user interface for identifying a type for a requirement in accordance with an illustrative embodiment.

Turning to FIG. 5, an illustration of a user interface for identifying a type for a requirement is depicted in accordance with an illustrative embodiment. In this example, user interface 500 may be an example of one implementation of user interface 124 for requirement generator 102 in FIG. 1 and of type identifier user interface 202 in user interface 200 in FIG. 2.

User interface 500 may be configured to be used by an operator to identify the type for a new requirement to be established or to change the identified type for an already established requirement. In user interface 500, the operator may be prompted to identify the type for a requirement by selecting the type for the requirement from among functional/performance requirement 502, design requirement 504, environmental requirement 506, and suitability requirement 508. Brief descriptions 510, 512, 514, and 516 of each of functional/performance requirement 502, design requirement 504, environmental requirement 506, and suitability requirement 508, respectively, may be provided to help the operator to select the appropriate type for the requirement. The operator may select help button 517 to receive additional help selecting the appropriate type for the requirement. The operator may identify the type for a requirement by selecting a check box associated with the appropriate requirement type in user interface 500. In this example, the operator has selected check box 518 associated with functional/performance requirement 502 to identify the type for the requirement.

User interface 500 also may be configured to allow an operator to enter, view, or enter and view, general information 520 regarding a requirement. For example, general information 520 may include information for identifying the requirement. For example, without limitation, general information 520 may include information for identifying the requirement in relation to other requirements in a document or other applications. For example, without limitation, general information 520 may include information for identifying the requirement in relation to a requirements management tool, such as requirements management tool 112 in FIG. 1, in which the requirement will be used.

User interface 500 also may be configured to allow an operator to change the requirement type for an established requirement. For example, an operator may open user interface 500 for an already established requirement. In this case, current text 522 of the established requirement may be displayed in user interface 500. The operator may use menu 524 provided on user interface 500 to change the current type for the established requirement to a different requirement type.

An operator may select create/update requirement button 526 after identifying or changing the type for a requirement in user interface 500. User interface 500 may be closed and a user interface for establishing or changing the requirement may be opened in response to the operator selecting create/update requirement button 526.

Figure 6:
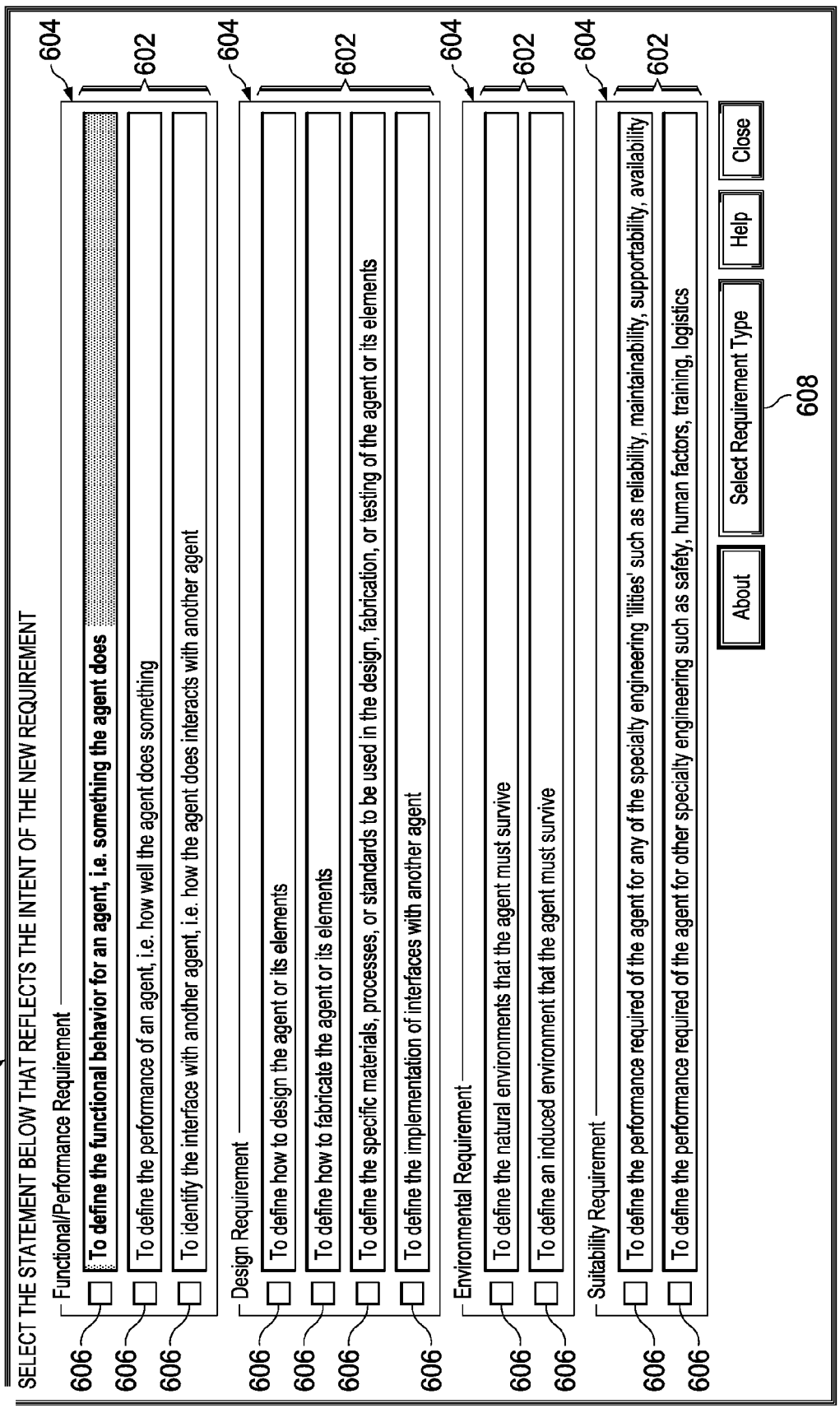
FIG. 6 is an illustration of a help user interface for identifying a type for a requirement in accordance with an illustrative embodiment.

Turning to FIG. 6, an illustration of a help user interface for identifying a type for a requirement is depicted in accordance with an illustrative embodiment. In this example, user interface 600 may be an example of one implementation of user interface 124 for requirement generator 102 in FIG. 1 and of help user interfaces 212 in user interface 200 in FIG. 2. For example, user interface 600 may be provided in response to an operator selecting help button 517 in user interface 500 in FIG. 5.

User interface 600 may be configured to help an operator to identify the appropriate type for a requirement. For example, user interface 600 may include number of statements 602 associated with each of a number of possible requirement types 604. The operator may be prompted to select one of check boxes 606 corresponding to one of statements 602 that applies to the requirement.

After selecting one of check boxes 606, the operator may select button 608 on user interface 600 to identify the type for the requirement. For example, the type for the requirement may be identified as the one of possible requirement types 604 corresponding to the selected one of check boxes 606 when the operator selects button 608. In response to selecting button 608 with one of check boxes 606 selected, the type for the requirement identified in user interface 600 may be provided to user interface 500 in FIG. 5 and user interface 600 may be closed. In this case, the selection of the type for a requirement in user interface 500 in FIG. 5 may be made automatically based on the one of check boxes 606 that is selected in user interface 600 when button 608 is selected.

Figure 7:
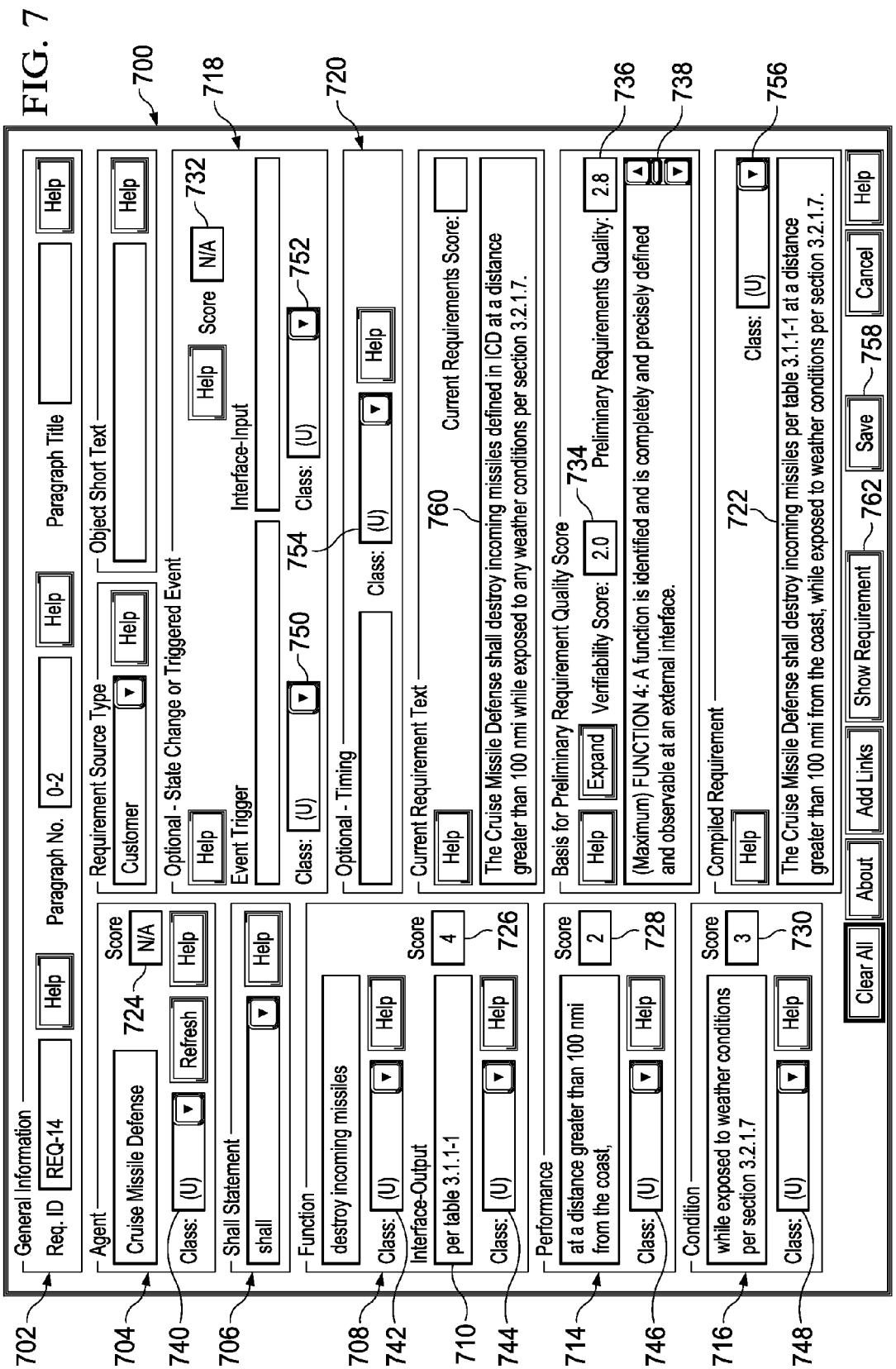
FIG. 7 is an illustration of a user interface for establishing a requirement in accordance with an illustrative embodiment.

Turning to FIG. 7, an illustration of a user interface for establishing a requirement is depicted in accordance with an illustrative embodiment. In this example, user interface 700 may be an example of one implementation of user interface 124 for requirement generator 102 in FIG. 1 and of requirement generation user interface for first requirement type 204 in user interface 200 in FIG. 2.

For example, without limitation, user interface 700 may be provided in response to an operator selecting create/update requirement button 526 in user interface 500 in FIG. 5. In this example, user interface 700 may be provided in response to the operator selecting create/update requirement button 526 in user interface 500 in FIG. 5 with check box 518 for functional/performance requirement 502 selected in user interface 500 in FIG. 5. Therefore, in this example, user interface 700 may be configured for establishing a functional/performance requirement.

User interface 700 may include general information 702 regarding the requirement. For example, general information 702 may be the same as general information 520 for the requirement in user interface 500 in FIG. 5.

User interface 700 may include a number of fields corresponding to the elements of the requirement. Each of the number of fields for the elements of the requirement may be configured to identify an element of the requirement and to prompt an operator to enter or select words or other information to establish the element of the requirement. The fields for the elements of the requirement that are provided in user interface 700 may depend upon the type of the requirement. The order or other arrangement of the fields for the elements of the requirement in user interface 700 may indicate the structure for the requirement. The structure for the requirement, and, therefore, the arrangement of the fields for the elements of the requirement in user interface 700, also may depend upon the type of the requirement. The structure for the requirement, and, therefore, the arrangement of the fields for the elements of the requirement in user interface 700, also may comply with the rules of grammar for a natural language.

In user interface 700, the fields for the elements of the requirement include fields for agent 704, shall statement 706, function 708, interface-output 710, performance 714, condition 716, state change or triggered event 718, and timing 720. In this example, user interface 700 indicates that state change or triggered event 718 and timing 720 may be optional elements of the requirement. The other elements may be mandatory elements of the requirement. An operator may be prompted to enter natural language words or other information in the fields for agent 704, shall statement 706, function 708, interface-output 710, performance 714, and condition 716, or to select from available natural language word options for agent 704, shall statement 706, function 708, interface-output 710, performance 714, and condition 716 to establish the mandatory elements of the requirement. The operator may be prompted to enter natural language words in the fields for state change or triggered event 718 or timing 720, or in the fields for both state change or triggered event 718 and timing 720, or to select from available natural language word options for state change or triggered event 718 or timing 720, or for both state change or triggered event 718 and timing 720, to establish one or more of the optional elements of the requirement. Alternatively, or additionally, one or more of the elements of the requirement may be established by automatically populating one or more of the fields for agent 704, shall statement 706, function 708, interface-output 710, performance 714, condition 716, state change or triggered event 718, and timing 720 from information related to the elements of the requirement in a requirements management tool.

The text of a requirement may be displayed as compiled requirement 722 in user interface 700. For example, compiled requirement 722 may be established automatically from the operator input in the fields for agent 704, shall statement 706, function 708, interface-output 710, performance 714, condition 716, state change or triggered event 718, and timing 720 to establish the elements of the requirement. In this example, compiled requirement 722 comprises a statement of the requirement in a natural language of humans; namely, English.

User interface 700 may be configured to display quality scores for one or more of the elements of the requirement. The quality scores may indicate the levels of quality for the corresponding elements of the requirement. The quality scores for the elements of the requirement may be established automatically based on the words for the elements as entered or selected by the operator in the fields for the elements of the requirement in user interface 700.

In user interface 700, quality scores 724, 726, 728, 730, and 732 may be displayed in the corresponding fields for one or more of agent 704, interface-output 710, performance 714, condition 716, and state change or triggered event 718, respectively. Quality scores 724, 726, 728, 730, and 732 may indicate the levels of quality for the corresponding elements of the requirement. In this example, quality scores 724, 726, 728, 730, and 732 may be indicated as numerical values in the range from 0 to 4. Quality scores may not be established for optional elements of a requirement for which no information is established. In cases where quality scores are not established for an element of the requirement, the quality score may be indicated as "N/A" or using some other appropriate indicator in user interface 700.

User interface 700 also may be configured to display an indication of the level of quality for the requirement as a whole. The level of quality for the requirement may be established based on the established levels of quality for the elements of the requirement. In user interface 700, quality scores 734 and 736 may be displayed to indicate the level of quality for the requirement. In this example, quality scores 734 and 736 for the requirement may established based on quality scores 724, 726, 728, 730, and 732 for elements of the requirement. Quality scores for elements of the requirement for which no numerical quality score is established may not be used to establish quality scores 734 and 736 for the requirement.

Quality scores 734 and 736 for the requirement may be based on different ones of quality scores 724, 726, 728, 730, and 732 for the elements of the requirement or based in different ways on quality scores 724, 726, 728, 730, and 732 for the elements of the requirement. For example, without limitation, quality score 734 for the requirement may be established automatically as the lowest one of quality scores 724, 726, 728, 730, and 732 established for the elements of the requirement. Quality score 736 for the requirement may be established automatically as the average of quality scores 724, 726, 728, 730, and 732 for the elements of the requirement or in another appropriate manner. Various quality scores may be established for a requirement in various ways depending upon the type of the requirement.

In this example, quality scores 734 and 736 for the requirement may be numerical scores in the range from 0 to 4. Scores in the range from greater than 3.5 to 4.0 may indicate a high quality requirement. In this case, all of the attributes of a high quality requirement are consistently satisfied in the elements of the requirement. Scores in the range from 3.0 to 3.5 may indicate a requirement of moderate quality. In this case, all of the attributes of a high quality requirement are inconsistently satisfied in the elements of the requirement. Some risks likely exist in using a requirement having a score in this range. Scores in the range from 2.0 to less than 3.0 may indicate a requirement of low quality. In this case, the attributes of a high quality requirement are not often satisfied in the elements of the requirement. A program using requirements having scores in this range may be considered at moderate risk for design and verification. Scores in the range from less than 2.0 to 0 may indicate a requirement of poor quality. In this case, the attributes of a high quality requirement are generally not satisfied in the elements of the requirement. A program using requirements having scores in this range may be considered at high risk for design and verification.

User interface 700 also may be configured to provide explanations 738 of the basis for quality scores 724, 726, 728, 730, and 732 for the elements of the requirement that may be used to establish quality scores 734 and 736 for the requirement. For example, explanations 738 may provide reasons for why a particular quality score was established for a particular element of the requirement. Quality scores 724, 726, 728, 730, and 732 for the elements of the requirement may be used by an operator in combination with explanations 738 to identify which elements of the requirement may be changed to increase the quality of the requirement and how such elements may be changed to increase the quality of the requirement.

User interface 700 also may be configured for establishing and displaying security classifications for a requirement and for the elements of the requirement. For example, an operator may be prompted to select or otherwise identify security classifications 740, 742, 744, 746, 748, 750, 752, and 754 for elements of the requirement in the corresponding fields for agent 704, function 708, interface-output 710, performance 714, condition 716, state change or triggered event 718, and timing 720 in user interface 700. User interface 700 also may be configured to display security classification 756 for the requirement as a whole. For example, security classification 756 for the requirement may be established automatically as the highest one of security classifications 740, 742, 744, 746, 748, 750, 752, and 754 for the elements of the requirement or in any other appropriate manner. User interface 700 may be configured to allow an operator to select or otherwise identify security classification 756 for the requirement manually, thereby to change security classification 756 for the requirement that may be established automatically. For example, an operator may identify security classification 756 for the requirement manually when the combination of the elements of the requirement calls for security classification 756 for the requirement that is higher than the highest one of security classifications 740, 742, 744, 746, 748, 750, 752, and 754 for the elements of the requirement.

A requirement may be established in user interface 700 by selecting save button 758. For example, in response to selecting save button 758 the requirement may be established as the requirement displayed in compiled requirement 722 and the established requirement may be saved. In other words, the requirement may be established from the current input for the elements of the requirement in the element fields for agent 704, shall statement 706, function 708, interface-output 710, performance 714, condition 716, state change or triggered event 718, and timing 720 when save button 758 is selected.

User interface 700 also may be configured to allow an operator to change an existing established requirement. For example, user interface 700 may be opened for an already established requirement. In this case, the established requirement may be displayed on user interface 700 as current requirement 760. The elements of the established requirement displayed as current requirement 760 may be used to populate the element fields for agent 704, shall statement 706, function 708, interface-output 710, performance 714, condition 716, state change or triggered event 718, and timing 720 in user interface 700.

The text of the requirement displayed as compiled requirement 722 may change as the operator makes changes to the elements of the requirement in the fields for agent 704, shall statement 706, function 708, interface-output 710, performance 714, condition 716, state change or triggered event 718, and timing 720. However, the text of the requirement displayed as current requirement 760 may not change until the operator selects save button 758 to establish and save the requirement. The operator may change the text of the requirement displayed as compiled requirement 722 to take into account any changes in the element fields for agent 704, shall statement 706, function 708, interface-output 710, performance 714, condition 716, state change or triggered event 718, and timing 720, without changing the established requirement displayed as current requirement 760 by selecting show requirement button 762.

Quality scores 724, 726, 728, 730, 732, 734, and 736 for the elements and for the requirement also may be updated to take into account any changes in the fields for agent 704, shall statement 706, function 708, interface-output 710, performance 714, condition 716, state change or triggered event 718, and timing 720, in response to the operator selecting show requirement button 762.

Figure 8A:
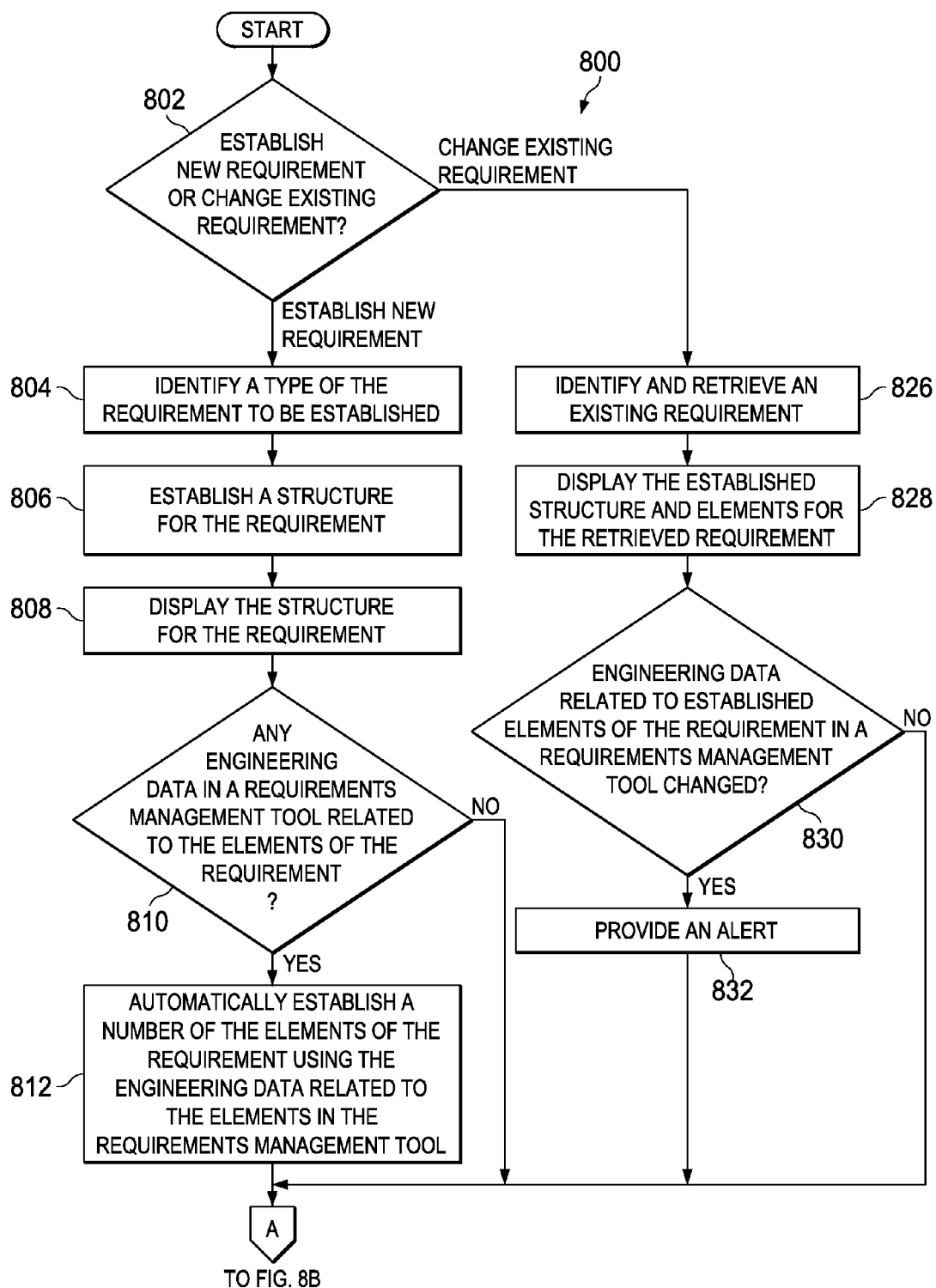
FIG. 8A and FIG. 8B are illustrations of a flowchart of a process for establishing a requirement in accordance with an illustrative embodiment.
Figure 8B:
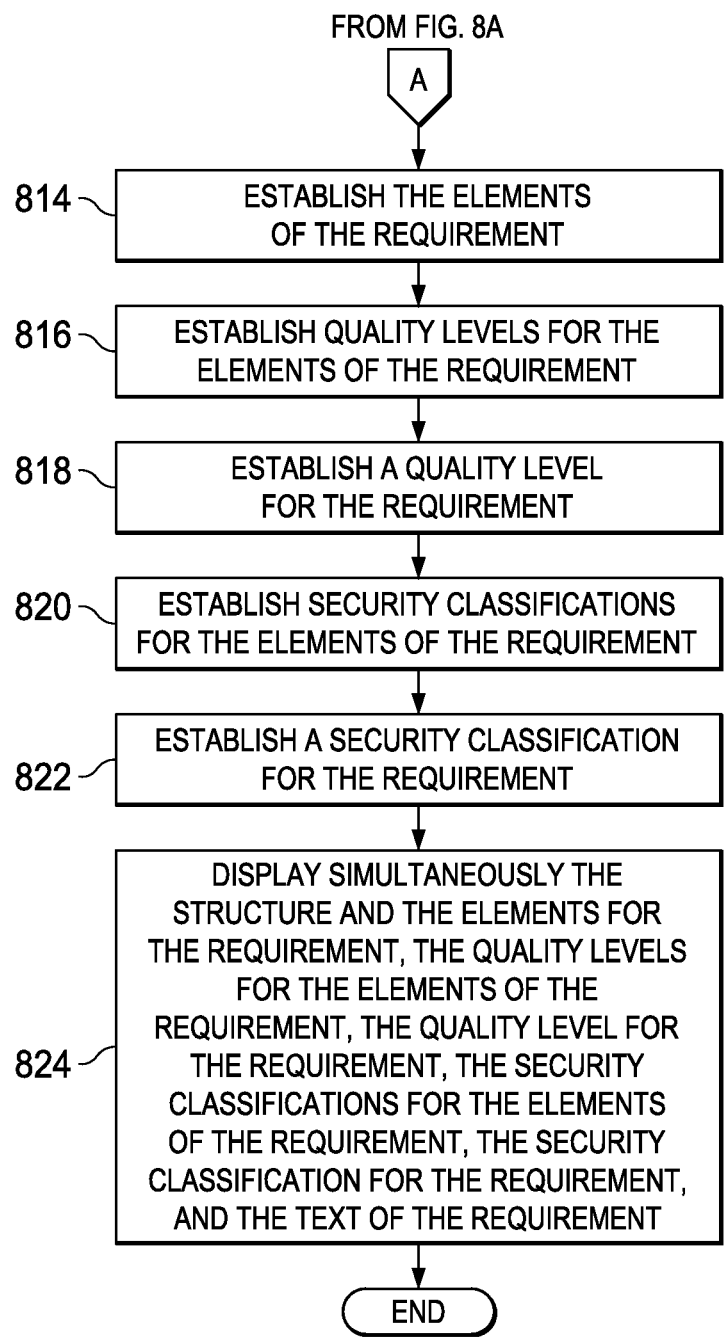

Turning to FIG. 8A and FIG. 8B, a flowchart of a process for establishing a requirement is depicted in accordance with an illustrative embodiment. For example, without limitation, process 800 may be performed by requirement generator 102 in FIG. 1.

Process 800 may begin by determining whether a new requirement is to be established or an existing requirement is to be changed (operation 802). In response to determining that a new requirement is to be established, a type of the requirement to be established may be identified (operation 804). For example, without limitation, operation 804 may include displaying a user interface to prompt an operator to identify the type of the requirement to be established and receiving a selection of the type of the requirement to be established from the operator via the user interface.

A structure for the requirement then may be established (operation 806). For example, the structure for the requirement may be established based on the type of the requirement identified in operation 804. The structure for the requirement may identify a number of elements for the requirement, various characteristics of the elements of the requirement, and relationships between the elements of the requirement. For example, without limitation, the structure for the requirement may identify one or more of an order or other arrangement for the elements of the requirement, whether any of the elements of the requirement may be optional, words, phrases, or punctuation separating or linking the elements of the requirement, or other characteristics of the elements of the requirement or of relationships between the elements of the requirement. The structure for the requirement may comply with the rules of grammar for a natural language.

The structure for the requirement then may be displayed (operation 808). For example, the structure for the requirement may be indicated by the order or other arrangement in a display of fields for each element of the requirement. In other words, fields for each element of the requirement may be arranged in a display in a manner to indicate the structure for the requirement.

It then may be determined whether there is any engineering data in a requirements management tool that may be related to the elements of the requirement (operation 810). In response to a determination that there is engineering data related to the elements of the requirement in a requirements management tool, a number of the elements of the requirement may be established automatically using the engineering data related to the elements in the requirements management tool (operation 812).

In response to a determination at operation 810 that there is no engineering data related to the elements of the requirement in the requirements management tool, the elements of the requirement may be established (operation 814). Similarly, after the number of the elements of the requirement are established automatically at operation 812, other elements of the requirement may be established at operation 814. For example, operation 814 may include displaying a user interface comprising a field for each element of the requirement. The field for each element of the requirement may be configured to prompt an operator to establish an element of the requirement and to receive information for establishing the element of the requirement from the operator. For example, the field for each element of the requirement may be configured to prompt the operator to enter or to select one or more words to establish the element of the requirement.

Quality levels for the elements of the requirement then may be established (operation 816). The quality levels for the elements of the requirement may indicate the degree to which the elements of the requirement are accurate, complete, and clear. For example, the quality levels for the elements of the requirement may be established by evaluating the words of the elements using appropriate quality criteria.

A quality level for the requirement then may be established (operation 818). The quality level for the requirement may indicate the degree to which the requirement is accurate, complete, and clear. For example, the quality level for the requirement may be established based on the quality levels for various elements of the requirement.

Security classifications for the elements of the requirement may be established (operation 820). For example, operation 820 may include displaying a user interface configured to prompt an operator to identify security classifications for the elements of the requirement and to receive the identifications of the security classifications for the elements of the requirement from the operator. For example, without limitation, the user interface may be configured to prompt the operator to select one from among a number of possible security classifications for each of a number of the elements of the requirement.

A security classification for the requirement then may be established (operation 822). For example, the security classification for the requirement may be established based on the security classifications for the elements of the requirement or may be identified by an operator.

The structure and the elements of the requirement, the quality levels for the elements of the requirement, the quality level for the requirement, the security classifications for the elements of the requirement, the security classification for the requirement, and the text of the requirement may be displayed simultaneously (operation 824), with the process terminating thereafter. For example, the text of the requirement may comprise the wording of the requirement in a natural language. The text of the requirement may be formed from the words of the elements of the requirement.

Returning to operation 802, in response to a determination at operation 802 that an existing requirement is to be changed, an existing requirement may be identified and retrieved (operation 826). For example, without limitation, the existing requirement may be stored in a data processing system or network and retrieved therefrom in any appropriate manner.

The existing requirement that is retrieved in operation 826 may be a complete established requirement or a partially complete requirement. The established structure and elements for the retrieved requirement then may be displayed (operation 828).

It then may be determined whether engineering data related to established elements of the requirement in a requirements management tool has changed (operation 830). If it is determined that engineering data related to established elements of the requirement in a requirements management tool has not changed, the process may continue with operation 814. In response to a determination that engineering data related to established elements of the requirement in a requirements management tool has changed, an alert may be provided (operation 832). For example, the alert may be provided in any appropriate form to indicate to an operator that an element of the requirement should be evaluated for possible modification because engineering data related to the element in a requirements management tool has changed. The process then may continue with operation 814.

Figure 9:
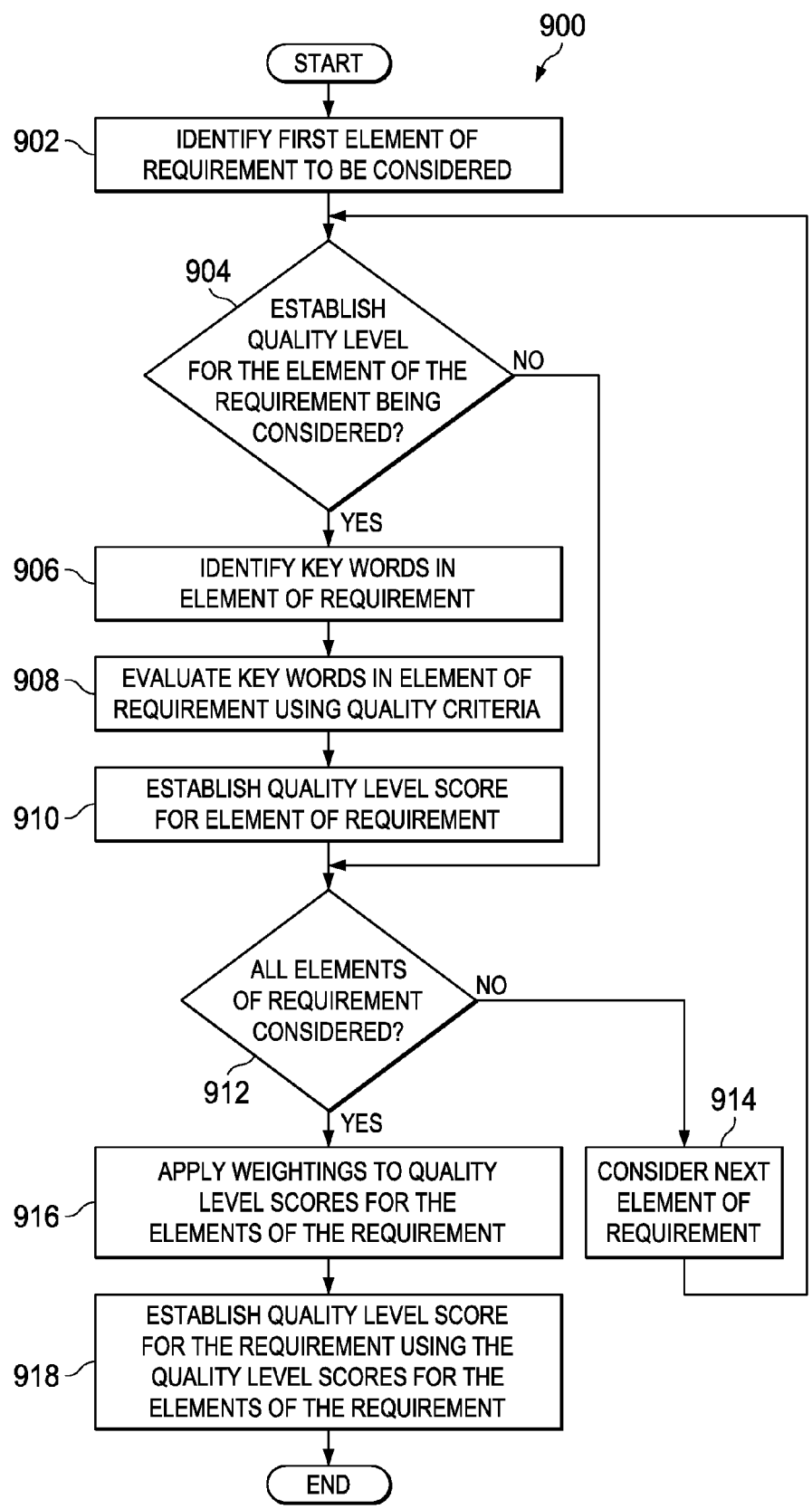
FIG. 9 is an illustration of a flowchart of a process for establishing quality levels for the elements of a requirement and for the requirement in accordance with an illustrative embodiment.

Turning to FIG. 9, an illustration of a flowchart of a process for establishing quality levels for the elements of a requirement and for the requirement is depicted in accordance with an illustrative embodiment. For example, without limitation, process 900 may be configured to establish quality levels for the elements of a requirement to indicate the degree to which the elements of the requirement are accurate, complete, and clear. For example, without limitation, process 900 may be performed by quality assessor 138 in requirement generator 102 in FIG. 1. For example, without limitation, process 900 may be an example of one implementation of a process for performing operation 816 and operation 818 in process 800 in FIG. 8B.

Process 900 may begin by identifying a first element of a requirement to be considered (operation 902). It then may be determined whether or not a quality level will be established for the element of the requirement being considered (operation 904). Quality levels may or may not be established for all of the elements of a requirement. For example, without limitation, quality levels may be established for the elements of the requirement that may have the greatest effect on the quality for the requirement as a whole. For example, without limitation, a quality level may not be established for an optional element of a requirement if the optional element of the requirement is not established by providing words for the optional element of the requirement. As another example, a quality level may not be established for an element of a requirement if a quality level has already been established for the element of the requirement and the words of the element have not changed since the quality level for the element of the requirement was established.

In response to a determination that the quality level for the element of the requirement is to be established, key words in the element of the requirement may be identified (operation 906). For example, without limitation, the key words that may be identified in the element of the requirement may include any appropriate number of words, phrases, or other information in the element of the requirement that may affect the quality level for the element.

The key words in the element of the requirement then may be evaluated using appropriate quality criteria (operation 908). For example, without limitation, quality criteria 400 in FIG. 4 may be an example of one implementation of the quality criteria that may be used to evaluate the words in the element of the requirement. For example, without limitation, the words in the element of the requirement may be evaluated by comparing the words in the element of the requirement to the quality criteria to determine whether or not certain words are missing or present in the element and the degree to which the words that are present in the element of the requirement are appropriate for the element of the requirement. For example, without limitation, the quality criteria that are used to evaluate the words in the element of the requirement may take into account words in other elements of the requirement.

Based on the evaluation performed in operation 908, a quality level score for the element of the requirement may be established (operation 910). For example, without limitation, the quality criteria that may be used to evaluate the words in the element of the requirement may be used to associate the words in the element of the requirement with a specific quality level score for the element of the requirement.

In response to the determination at operation 904 that the quality level for an element of a requirement being considered is not to be established, or after establishing a quality level score for an element of a requirement being considered at operation 910, it may be determined whether or not all of the elements of the requirement have been considered (operation 912). In response to a determination that all of the elements of the requirement have not been considered, a next element of the requirement may be considered (operation 914), and the process may return to operation 904 to determine whether a quality level is to be established for the next element of the requirement being considered.

In response to a determination at operation 912 that all of the elements of the requirement have been considered, weightings may be applied to the quality level scores for the elements of the requirement (operation 916). The quality levels for various different elements of the requirement may affect the quality level for the requirement as a whole in various different ways or to various different degrees. The weightings for the quality level scores for the elements of the requirement may identify the relative effects of the quality levels for various elements of the requirement on the quality level for the requirement as a whole. The weightings for the quality level scores for the elements of the requirement may be fixed or may be adjustable by an operator. Operation 916 for applying different weightings to the quality level scores for the elements of the requirement may be optional.

A quality level score then may be established for the requirement using the quality level scores for the elements of the requirement (operation 918), with the process terminating thereafter. For example, without limitation, the quality level score for the requirement may be established by combining the quality level scores for the elements of the requirement in an appropriate manner. For example, without limitation, the quality level score for the requirement may be established as a weighted average of the quality level scores for the elements of the requirement using the appropriate weightings applied to the quality level scores for the elements of the requirement in operation 916.

Process 900 may be initiated by an operator to automatically establish quality level scores for a requirement and for various elements of the requirement. Alternatively, or in addition, process 900 may be initiated automatically on a periodic basis, in response to the occurrence of an event, or both. In any case, without limitation, process 900 may be performed in real-time as a requirement is being established by an operator to provide real-time feedback to the operator regarding the quality levels of the requirement and of the elements of the requirement.

Providing real-time evaluations of the quality levels for requirements in accordance with an illustrative embodiment enables system engineers or other operators to write higher quality requirements in a more efficient manner. For example, without limitation, providing real-time evaluations of the quality levels for requirements in accordance with an illustrative embodiment may enable system engineers or other operators for a supplier or other entity to assess the quality of customer requirements for a product or service and to write higher quality derived requirements from the customer requirements in an accurate and efficient manner. Establishing the quality levels for requirements in accordance with an illustrative embodiment also may enable the program wide assessment of requirements for a product from across various technical disciplines to enable new product design architectures.

Figure 10:
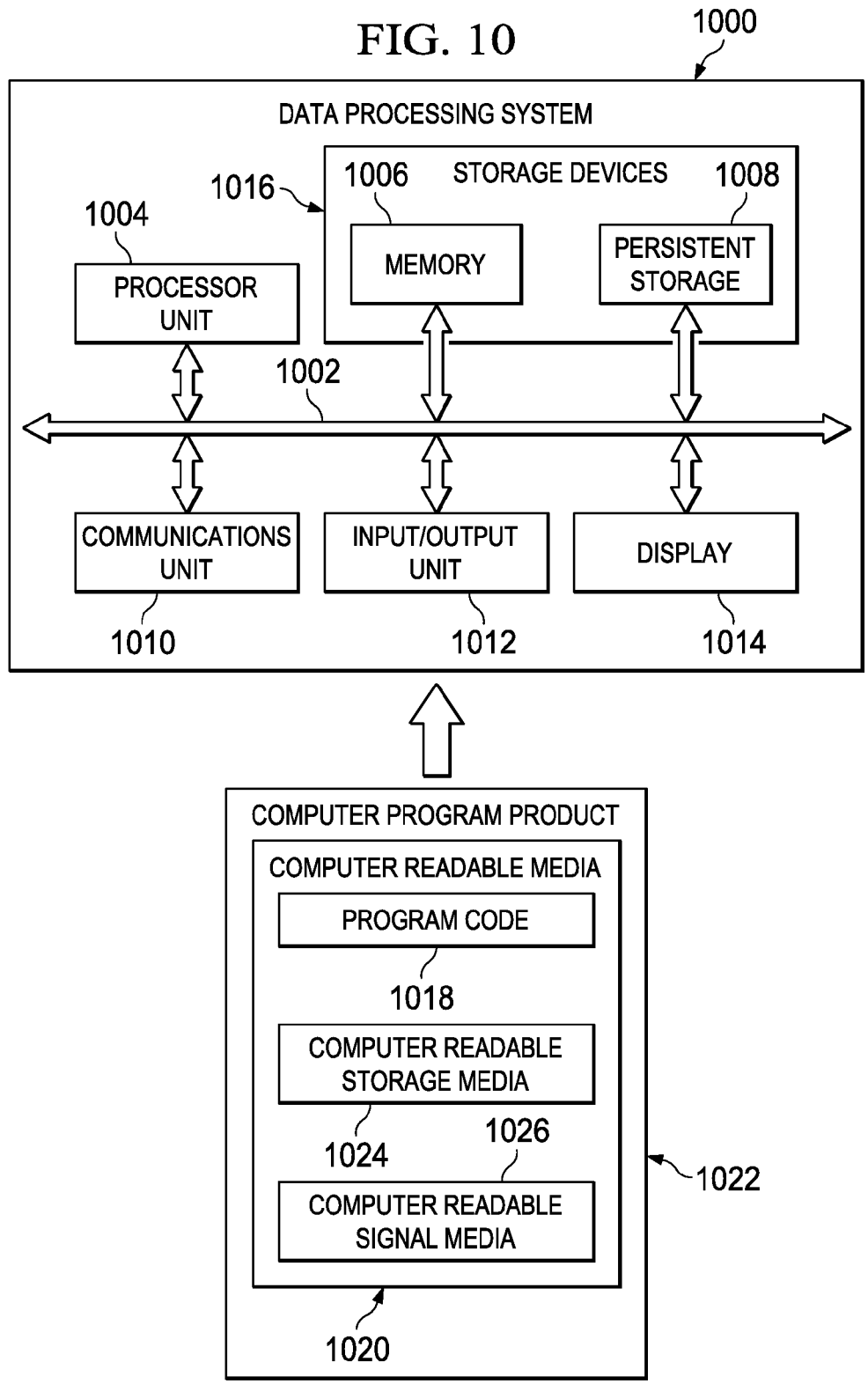
FIG. 10 is an illustration of a block diagram of a data processing system in accordance with an illustrative embodiment.

Turning to FIG. 10, an illustration of a block diagram of a data processing system is depicted in accordance with an illustrative embodiment. In this example, data processing system 1000 may be an example of one implementation of computer system 114 in FIG. 1. In this illustrative example, data processing system 1000 includes communications fabric 1002. Communications fabric 1002 provides communications between processor unit 1004, memory 1006, persistent storage 1008, communications unit 1010, input/output (I/O) unit 1012, and display 1014.

Processor unit 1004 serves to execute instructions for software that may be loaded into memory 1006. Processor unit 1004 may be a number of processors, a multi-processor core, or some other type of processor, depending on the particular implementation. Further, processor unit 1004 may be implemented using a number of heterogeneous processor systems in which a main processor is present with secondary processors on a single chip. As another advantageous example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for execution by processor unit 1004. The processes of the different embodiments may be performed by processor unit 1004 using computer-implemented instructions, which may be located in a memory, such as memory 1006.

These instructions are referred to as program instructions, program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026. Computer readable storage media 1024 may include, for example, an optical or magnetic disk that is inserted or placed into a drive or other device that is part of persistent storage 1008 for transfer onto a storage device, such as a hard drive, that is part of persistent storage 1008.

Computer readable storage media 1024 also may take the form of a persistent storage, such as a hard drive, a thumb drive, or a flash memory, that is connected to data processing system 1000. In some instances, computer readable storage media 1024 may not be removable from data processing system 1000. In these examples, computer readable storage media 1024 is a physical or tangible storage device used to store program code 1018 rather than a medium that propagates or transmits program code 1018. Computer readable storage media 1024 is also referred to as a computer readable tangible storage device or a computer readable physical storage device. In other words, computer readable storage media 1024 is a media that can be touched by a person.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different advantageous embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code. As one example, data processing system 1000 may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system.

Additionally, communications unit 1010 may include a number of devices that transmit data, receive data, or transmit and receive data. Communications unit 1010 may be, for example, a modem or a network adapter, two network adapters, or some combination thereof. Further, a memory may be, for example, memory 1006, or a cache, such as found in an interface and memory controller hub that may be present in communications fabric 1002.

Figure 11:
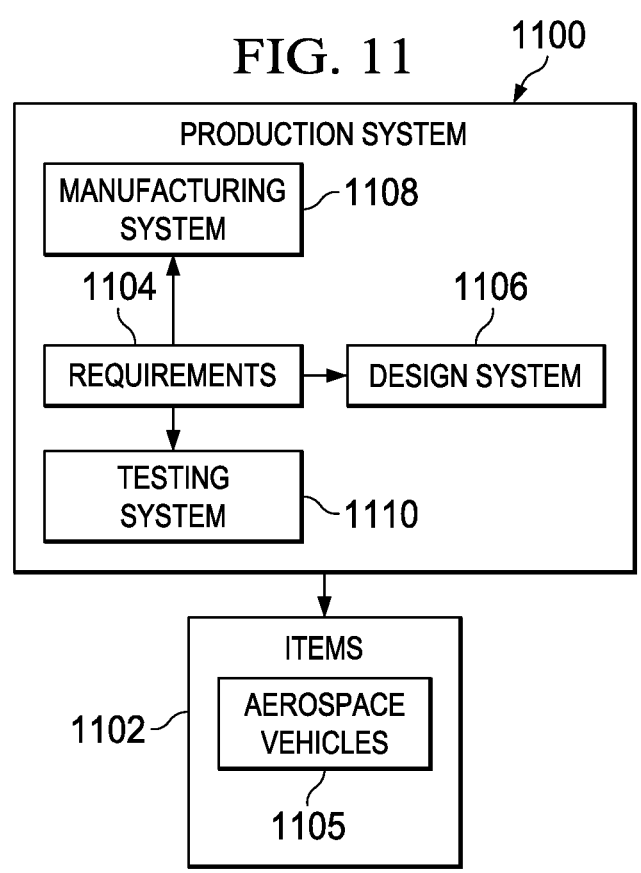
FIG. 11 is an illustration of a block diagram of a production system in accordance with an illustrative embodiment.

Turning to FIG. 11, an illustration of a block diagram of a production system is depicted in accordance with an illustrative embodiment. In this example, production system 1100 may be an example of one implementation of a system for producing items 1102 that satisfy requirements 1104. Items 1102 may include products, services, or a combination of products and services.

For example, without limitation, items 1102 may include aerospace vehicles 1105. Aircraft, launch vehicles, and any other vehicles configured for operation in the air, in space, or both in the air and in space may be examples of aerospace vehicles 1105. Aerospace vehicles 1105 may be relatively complex. Establishing requirements 1104 for aerospace vehicles 1105 and other relatively complex items 1102 may not be performed in any practical manner by human developers alone. However, the illustrative embodiments described herein provide a technical solution to the problem of establishing requirements 1104 for aerospace vehicles 1105 and other items 1102 in an effective and efficient manner.

Requirements 1104 established in accordance with an illustrative embodiment may describe items 1102 completely, accurately, and unambiguously. For example, requirements 1104 may be an example of requirement 106 established using requirement generator 102 in FIG. 1.

Production system 1100 may include design system 1106, manufacturing system 1108, and testing system 1110. Requirements 1104 may be used to control design system 1106, manufacturing system 1108, and testing system 1110 to produce items 1102 that satisfy desires and expectations for items 1102. Furthermore, items 1102 produced by production system 1100 using requirements 1104 established in accordance with an illustrative embodiment may be produced in less time, at less cost, or both.

Design system 1106 may include any appropriate system for designing items 1102. Requirements 1104 for items 1102 may be used to control design system 1106 to include various technical characteristics of items 1102 defined by requirements 1104 in designs for items 1102 by design system 1106. Requirements 1104 for items 1102 also may be used to control design system 1106 to provide designs for items 1102 that satisfy requirements 1104.

Manufacturing system 1108 may be a physical hardware system that is configured to manufacture items 1102. Requirements 1104 for items 1102 may be used to control how items 1102 are manufactured by manufacturing system 1108.

Testing system 1110 may include any appropriate system for testing items 1102. Requirements 1104 for items 1102 may be used to control how items 1102 are tested by testing system 1110 to determine whether items 1102 satisfy requirements 1104.

One or more of the illustrative embodiments provides a method and an apparatus for establishing structured, natural language, text-based requirements. In accordance with an illustrative embodiment, requirements may be established from well-defined elements of high quality requirements. A quality evaluation may be provided to the requirement writer as the requirement is being generated.

The quality evaluation may provide specific guidance regarding which elements of the requirement should be included and improved and how they may be modified to improve requirement quality. A method and an apparatus in accordance with an illustrative embodiment enable an operator to prepare consistently high-quality text-based requirements with minimal training. A method and an apparatus in accordance with an illustrative embodiment may be used in combination with a variety of requirements management tools.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a computer system comprising:
  a requirement generator configured to establish a structure for a written description of mandatory characteristics of an item forming a requirement and establish elements for the written description of the requirement, wherein the structure of the written description for the requirement defines a relationship between the elements of the written description; and
  a quality assessor configured to establish a quality level for the elements indicating a degree to which the elements of the requirement express the mandatory characteristics of the item based on words in the elements and quality criteria used to associate the words in the elements of the requirement with the quality level for the elements and to establish a quality level for the requirement based on the quality level for the elements of the written description of the requirement indicating a degree to which the written description for the requirement expresses the mandatory characteristics of the item.

2. The apparatus of claim 1, wherein:
the item for which the requirement expresses the mandatory characteristics and for which the quality level indicates the degree to which the written description expresses the mandatory characteristics is an aerospace vehicle comprising at least a million parts;
the requirement generator is configured to establish automatically a number of the elements of the written description of the mandatory characteristics of the aerospace vehicle using engineering data related to the number of the elements of the written description in a requirements management tool;
the quality level indicates the degree to which the written description for the requirement at least one of:
  accurately expresses the mandatory characteristics of the aerospace vehicle,
  completely expresses the mandatory characteristics of the aerospace vehicle, and
  unambiguously expresses the mandatory characteristics of the aerospace vehicle; and
a higher quality level for the written description of the requirement for the aerospace vehicle at least one of:
  reduces a risk of miscommunication between an acquirer and a supplier of the aerospace vehicle; and
  makes determining whether the item satisfies the requirement for the aerospace vehicle easier.

3. The apparatus of claim 1, wherein the quality level indicating the degree to which the written description for the requirement expresses the mandatory characteristics of the item is a score selected from a range of scores comprising at least three different scores.

4. The apparatus of claim 2, wherein the quality assessor is configured to identify whether words are missing in the elements of the written description of the requirement for the aerospace vehicle and to identify whether words are correct in the elements of the written description of the requirement for the aerospace vehicle.

5. The apparatus of claim 2, wherein the requirement generator comprises a graphical user interface configured to:
display the structure for the written description of the requirement;
receive the elements for the written description of the requirement; and
display an indication of the quality level indicating the degree to which the written description for the requirement expresses the mandatory characteristics of the item.

6. The apparatus of claim 5, wherein:
the requirement generator is configured to identify a change in the engineering data related to the elements of the written description of the requirement in the requirements management tool; and
the graphical user interface is configured to display an alert in response to an identification of the change in the engineering data related to the elements of the written description of the requirement in the requirements management tool.

7. The apparatus of claim 5, wherein:
the graphical user interface is configured to receive a security classification for the elements of the written description of the mandatory characteristics in the requirement for the aerospace vehicle; and
the requirement generator is configured to establish a security classification for the written description of the mandatory characteristics in the requirement for the aerospace vehicle based on the security classification for the elements of the written description of the mandatory characteristics in the requirement for the aerospace vehicle.

8. The apparatus of claim 1 further comprising:
a type identifier in the computer system configured to identify a type of the requirement selected from the group consisting of functional requirement, performance requirement, design requirement, environmental requirement and suitability requirement; and
a requirement formatter in the computer system configured to establish the structure of the written description for the requirement based on the type of the requirement selected from the group consisting of functional requirement, performance requirement, design requirement, environmental requirement and suitability requirement.

9. The apparatus of claim 2, wherein:
the requirement for the aerospace vehicle is a statement in a natural language of humans; and
the quality assessor is configured to establish the quality level indicating the degree to which the written description for the requirement expresses the mandatory characteristics of the aerospace vehicle in real-time.

10. An apparatus comprising:
a requirement generator configured to:
  establish a structure for a written description of mandatory characteristics of an aerospace vehicle forming a requirement,
  establish automatically elements for the written description of the requirement of the aerospace vehicle using engineering data related to the elements of the written description of the requirement in a requirements management tool, and identify a change in the engineering data related to the elements of the written description of the requirement in the requirements management tool, wherein the structure of the written description for the requirement of the aerospace vehicle defines a relationship between the elements of the written description for the requirement of the aerospace vehicle;

a quality assessor configured to establish a quality level indicating a degree to which the written description for the requirement of the aerospace vehicle expresses the mandatory characteristics of the aerospace vehicle; and a user interface configured to:
display the structure for the requirement of the aerospace vehicle,
receive the elements for the requirement of the aerospace vehicle,
display a representation of the quality level for the written description of the requirement of the aerospace vehicle, and
display an alert in response to an identification of the change in the engineering data related to the elements of the written description of the requirement in the requirements management tool.

11. The apparatus of claim 10, wherein the quality assessor is configured to:
establish a quality level for the elements indicating the degree to which the elements of the requirement express the mandatory characteristics of the aerospace vehicle based on words in the elements and quality criteria; and
establish the quality level indicating the degree to which the written description for the requirement expresses the mandatory characteristics of the aerospace vehicle based on the quality level for the elements indicating the degree to which the elements of the requirement express the mandatory characteristics of the aerospace vehicle.

12. A method for establishing a requirement comprising:
identifying a type of the requirement selected from the group consisting of functional requirement, performance requirement, design requirement, environmental requirement, and suitability requirement;
establishing, by a processor unit, a structure for a written description of the requirement based on the type of the requirement selected from the group consisting of functional requirement, performance requirement, design requirement, environmental requirement, and suitability requirement;
establishing, by the processor unit, elements comprised in the requirement;
establishing, by the processor unit, a quality level for the elements indicating the degree to which the elements of the requirement express mandatory characteristics of an item based on words in the elements and quality criteria used to associate the words in the elements of the requirement with the quality level for the elements;
establishing, by the processor unit, a quality level for the requirement based on the quality level for the elements of the written description of the requirement indicating a degree to which the written description of the mandatory characteristics of the item comprised in the requirement expresses the mandatory characteristics of the item; and
displaying simultaneously the structure for the requirement, the elements for the requirement, and an indication of the quality level for the written description of the requirement.

13. The method of claim 12, wherein:
the item for which the requirement expresses the mandatory characteristics and for which the quality level indicates the degree to which the written description expresses the mandatory characteristics is an aerospace vehicle comprising at least a million parts;
establishing the elements comprised in the requirement comprises automatically establishing a number of the elements of the written description of the mandatory characteristics of the aerospace vehicle using engineering data related to the number of the elements of the written description in a requirements management tool;
the quality level indicates the degree to which the written description for the requirement:
accurately expresses the mandatory characteristics of the aerospace vehicle,
completely expresses the mandatory characteristics of the aerospace vehicle, and
unambiguously expresses the mandatory characteristics of the aerospace vehicle; and
a higher quality level for the written description of the requirement for the aerospace vehicle both:
reduces a risk of miscommunication between an acquirer and a supplier of the aerospace vehicle; and
makes determining whether the item satisfies the requirement for the aerospace vehicle easier.

14. The method of claim 12 further comprising:
identifying, by the processor unit, a change in engineering data related to the elements of the written description of the requirement in a requirements management tool; and
displaying an alert in response to identifying the change in the engineering data related to the elements of the written description of the requirement in the requirements management tool.

15. The method of claim 12,
further comprising displaying an indication of the quality level for the elements of the written description of the requirement and an explanation of the quality level for the elements of the written description of the requirement.

16. The method of claim 12, wherein the quality level indicating the degree to which the written description for the requirement expresses the mandatory characteristics of the item is a score selected from a range of scores comprising at least three scores.

17. The method of claim 12 further comprising:
receiving, by the processor unit, a security classification for the elements of the written description of the mandatory characteristics in the requirement for the item; and
establishing, by the processor unit, a security classification for the written description of the mandatory characteristics in the requirement for the item based on the security classification for the elements of the written description of the mandatory characteristics in the requirement for the item.

18. The method of claim 12, wherein establishing the quality level for the requirement comprises identifying whether words are missing in the elements of the written description of the requirement for the type of the requirement selected from the group consisting of functional requirement, performance requirement, design requirement, environmental requirement and suitability requirement and identifying whether words are correct in the elements of the written description of the requirement for the type of the requirement selected from the group consisting of functional requirement, performance requirement, design requirement, environmental requirement and suitability requirement.

19. The method of claim 12, wherein:

the requirement is a statement in a natural language of humans; and establishing the quality level indicating the degree to which the written description of mandatory characteristics of the item comprised in the requirement expresses the mandatory characteristics of the item comprises establishing the quality level indicating the degree to which the written description for the requirement expresses the mandatory characteristics of the item in real-time.

* * * * *

UNITED STATES PATENT AND TRADEMARK OFFICE
CERTIFICATE OF CORRECTION

| | | |
|---|---|---|
| PATENT NO. | : 8,886,588 B2 | Page 1 of 1 |
| APPLICATION NO. | : 14/020544 | |
| DATED | : November 11, 2014 | |
| INVENTOR(S) | : Carson et al. | |

It is certified that error appears in the above-identified patent and that said Letters Patent is hereby corrected as shown below:

On the title page item (72), line 1, "Richard Steven Carson" should read --Ronald Steven Carson--

Signed and Sealed this
Twenty-fourth Day of February, 2015

Michelle K. Lee
*Deputy Director of the United States Patent and Trademark Office*